United States Patent
Suzuki et al.

(10) Patent No.: US 12,184,128 B2
(45) Date of Patent: Dec. 31, 2024

(54) ELECTRIC ROTATING MACHINE APPARATUS AND ELECTRIC POWER STEERING APPARATUS

(71) Applicant: Mitsubishi Electric Corporation, Tokyo (JP)

(72) Inventors: Junya Suzuki, Tokyo (JP); Akira Kimishima, Tokyo (JP); Takahisa Kawaguchi, Tokyo (JP); Takanori Ichikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 197 days.

(21) Appl. No.: 17/789,555

(22) PCT Filed: Jan. 16, 2020

(86) PCT No.: PCT/JP2020/001276
§ 371 (c)(1),
(2) Date: Jun. 28, 2022

(87) PCT Pub. No.: WO2021/144918
PCT Pub. Date: Jul. 22, 2021

(65) Prior Publication Data
US 2023/0032809 A1    Feb. 2, 2023

(51) Int. Cl.
*H02K 11/33* (2016.01)
*H02K 3/50* (2006.01)
*B62D 5/04* (2006.01)

(52) U.S. Cl.
CPC .............. *H02K 11/33* (2016.01); *H02K 3/50* (2013.01); *B62D 5/04* (2013.01); *H02K 2203/09* (2013.01)

(58) Field of Classification Search
CPC ....... H02K 11/33; H02K 3/50; H02K 2203/09
(Continued)

(56) References Cited

U.S. PATENT DOCUMENTS

| 4,614,904 A | 9/1986 | Yamazaki et al. |
| 2016/0254732 A1 | 9/2016 | Kojima et al. |

FOREIGN PATENT DOCUMENTS

| EP | 3202019 A1 | 8/2017 |
| EP | 3 972 096 A1 | 3/2022 |

(Continued)

OTHER PUBLICATIONS

Extended European Search Report dated Dec. 20, 2022 in European Application No. 20913304.0.

(Continued)

*Primary Examiner* — Jose A Gonzalez Quinones
(74) *Attorney, Agent, or Firm* — Sughrue Mion, PLLC; Richard C. Turner

(57) ABSTRACT

An electric rotating machine apparatus includes
an electric rotating machine having a windings and an output axle,
a power module having a switching device connected with the winding,
a bus bar that is held by a bus-bar holder and is included in a power-supply path to the power module,
two or more smoothing capacitors connected with the bus bar, and
a capacitor holder in which at a more outer side in the radial direction of the electric rotating machine than the bus-bar holder is, the two or more smoothing capacitors are arranged in the axial direction of the electric rotating machine, and that holds the two or more smoothing capacitors from the outer circumferential side of the electric rotating machine.

17 Claims, 20 Drawing Sheets

(58) Field of Classification Search
USPC .......................................... 310/68 B, 68 D, 71
See application file for complete search history.

(56) References Cited

FOREIGN PATENT DOCUMENTS

| | | | | | |
|---|---|---|---|---|---|
| FR | 3026904 | A1 * | 4/2016 | ............... | H01G 4/35 |
| JP | 60-62871 | U | 5/1985 | | |
| JP | 6-80363 | U | 11/1994 | | |
| JP | 2016-163416 | A | 9/2016 | | |
| JP | 6608555 | B1 * | 11/2019 | ........... | B62D 5/0406 |
| WO | WO-2019064423 | A1 * | 4/2019 | ........... | B62D 5/0406 |

OTHER PUBLICATIONS

International Search Report for PCT/JP2020/001276 dated Mar. 17, 2020.
Written Opinion for PCT/JP2020/001276 dated Mar. 17, 2020.
Communication dated May 23, 2023, issued in Japanese Application No. 2021-570567.
Chinese Office Action dated Aug. 30, 2024 in Application No. 202080090773.7.

* cited by examiner

ELECTRIC ROTATING MACHINE APPARATUS AND ELECTRIC POWER STEERING APPARATUS

CROSS REFERENCE TO RELATED APPLICATIONS

This application is a National Stage of International Application No. PCT/JP2020/001276 filed Jan. 16, 2020.

TECHNICAL FIELD

The present disclosure relates to an electric rotating machine apparatus and an electric power steering apparatus.

BACKGROUND ART

In a driving apparatus in which on the output axle of a conventional electric rotating machine, the electric rotating machine and a control unit are coaxially integrated with each other, there is sometimes found a structure in which a stator, a rotor, and the like are contained in the case of the electric rotating machine and in which the control unit is assembled in a multi-layered manner close to the electric rotating machine. In addition, there has been a driving apparatus having a structure in which control boards and power modules containing switching devices for supplying currents to an electric rotating machine are erected in parallel with one another in the axial direction of the output axle (Patent Document 1).

CITATION LIST

Patent Literature

Patent Document 1: Japanese Patent Application Laid-Open No. 2016-163416

The conventional apparatus disclosed in Patent Document 1 has a structure in which a control unit is integrated at the motor end portion opposite to the output side of the motor output axle (hereinafter, referred to as an anti-output side). In the case where mounting such an integrated apparatus in a vehicle is considered, restriction on the mounting in the vehicle often makes it difficult to mount the apparatus in the vehicle, when the control unit expands in radial direction of the motor. In contrast, as far as the length thereof in the motor output-axle direction is concerned, even a relatively large length can be often allowed. Accordingly, the radial-direction area of the control unit needs to be the same as or smaller than that of the motor. In addition, in particular, in the case of an electric power steering apparatus provided with independent two sets each of motor windings and motor driving circuits, in order to arrange large-size components such as a power module and a smoothing capacitor without expanding the radial-direction area of the control unit, it is required to contrive the shapes of bus bars for connecting those components and the arrangement of the bus bars.

Accordingly, in the conventional control unit disclosed in Patent Document 1, the power module and the control board are erected in parallel with each other in the output-axle direction, and a bus bar unit holding bus bars for supplying electric power to the power module from the outside is provided adjacent to the surface of the heat sink. In addition, on the surface on which the bus bar unit is mounted, two or more smoothing capacitors for smoothing a driving electric power supplied from an external power source and for reducing noise are mounted and are electrically connected with the bus bars.

However, in Patent Document 1, the structure of holding the smoothing capacitors is not referred to. When an impact or vibration is applied to the electric power steering apparatus, the smoothing capacitor largely vibrates; therefore, in the case where the smoothing capacitor is held only by the connection portion between the terminal of the smoothing capacitor and the bus bar, the connection portion between the terminal and the bus bar may be deteriorated or a connection failure of the smoothing capacitor may be caused. Therefore, it is required that without deteriorating the assembly efficiency, the structure of holding the smoothing capacitor while maintaining a high vibration resistance is realized.

An electric rotating machine apparatus according to the present disclosure has been implemented in order to solve the foregoing problems in the conventional apparatuses. Patent Document 1 describes a motor, i.e., an electric motor; however, the same description can be applied to an electric rotating machine, including an electric motor and an electric power generator.

SUMMARY OF INVENTION

An objective of the present disclosure is to provide an electric rotating machine apparatus in which a control apparatus and an electric rotating machine are integrated with each other and that has a high vibration resistance and an excellent product-assembly efficiency. In addition, another objective of the present disclosure is to obtain an electric power steering apparatus provided with an electric rotating machine apparatus having an excellent product-assembly efficiency.

Solution to Problem

An electric rotating machine apparatus according to the present disclosure includes
- an electric rotating machine having a winding and an output axle,
- a power module having a switching device connected with the winding,
- a bus bar that is held by a bus-bar holder and is included in a power-supply path to the power module,
- two or more smoothing capacitors connected with the bus bar, and
- a capacitor holder in which at a more outer side in a radial direction of the electric rotating machine than the bus-bar holder is, the two or more smoothing capacitors are arranged in an axial direction of the electric rotating machine, and that holds the two or more smoothing capacitors from an outer circumferential side of the electric rotating machine.

An electric power steering apparatus according to the present disclosure includes the foregoing electric rotating machine apparatus.

Advantage of Invention

The present disclosure related to an electric rotating machine apparatus and an electric power steering apparatus makes it possible to provide an apparatus that has a high vibration resistance and an excellent product-assembly efficiency.

DESCRIPTION OF EMBODIMENTS

1. Embodiment 1

Figure 1:
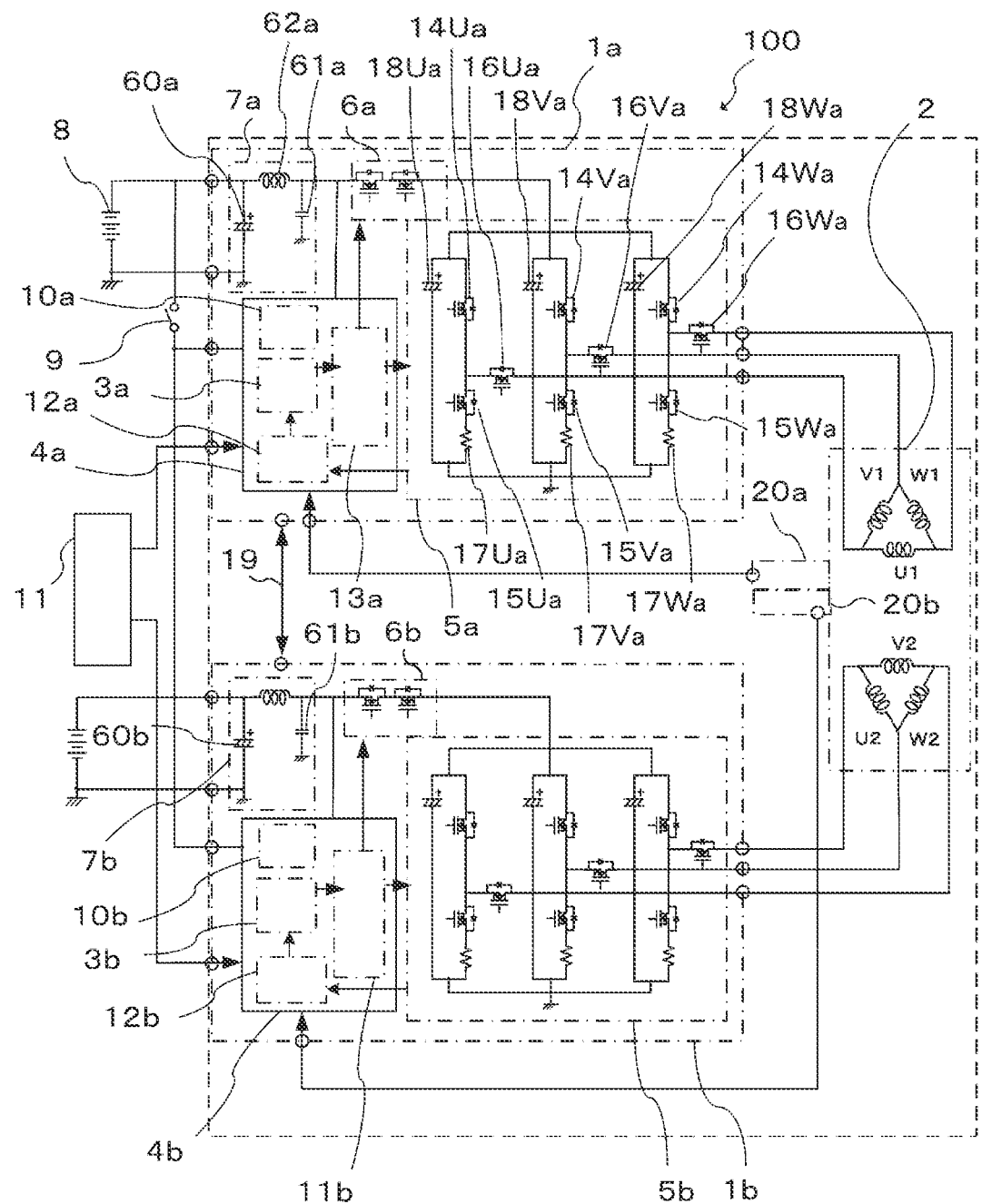
FIG. 1 is a circuit diagram of an electric rotating machine apparatus according to Embodiment 1.
Figure 2:
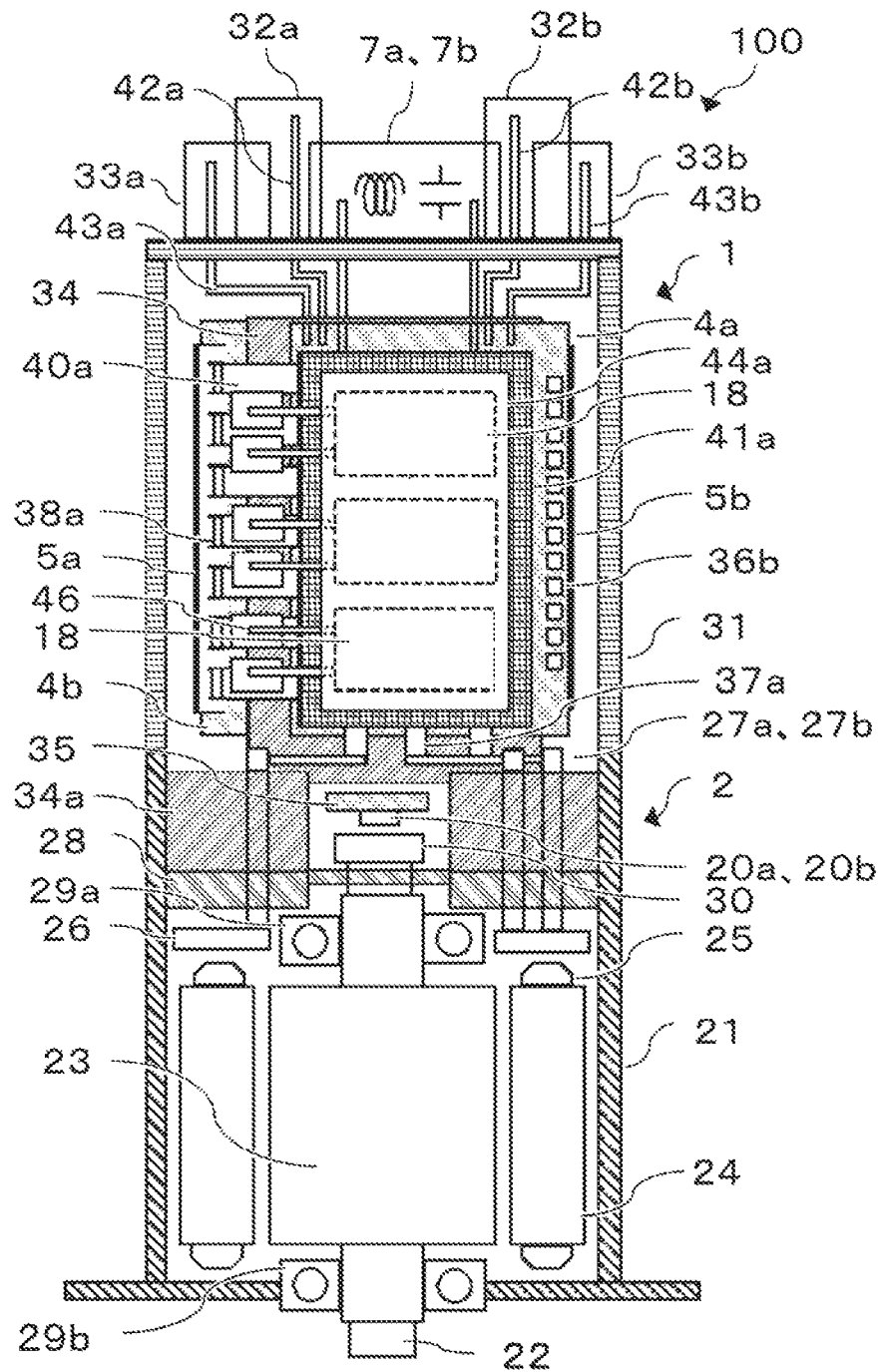
FIG. 2 is a cross-sectional view of the electric rotating machine apparatus according to Embodiment 1.
Figure 3:
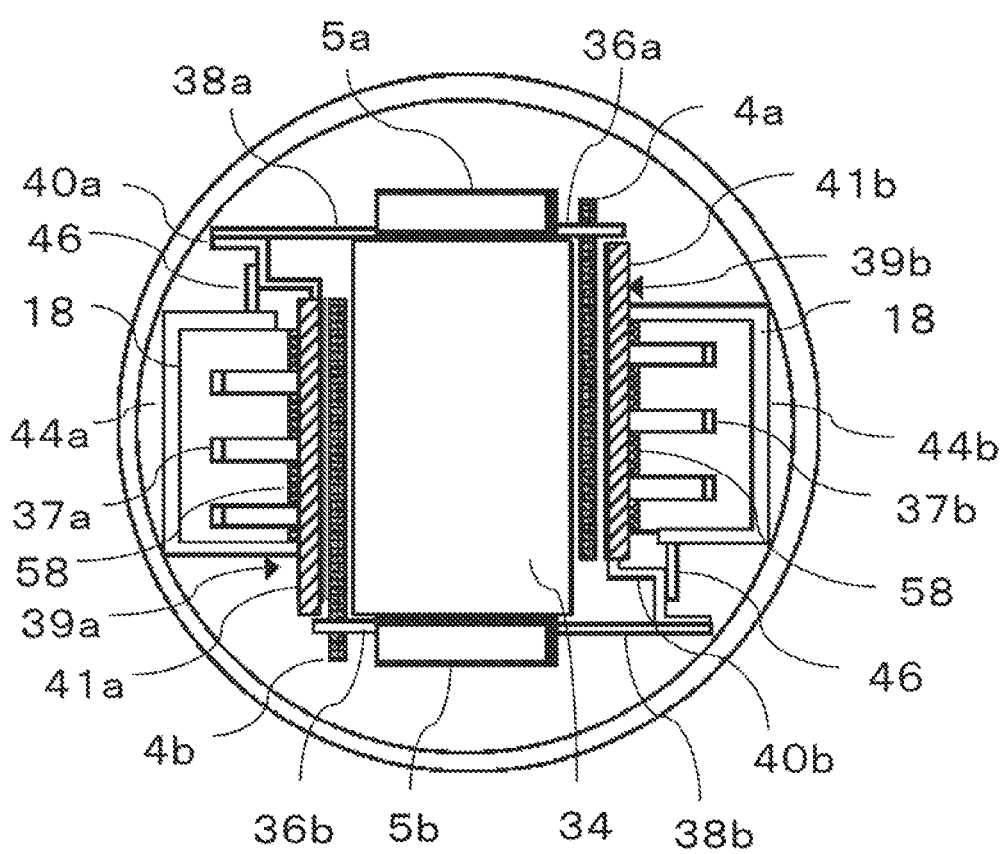
FIG. 3 is a perspective view of the electric rotating machine apparatus according to Embodiment 1, when viewed from the top side.
Figure 4:
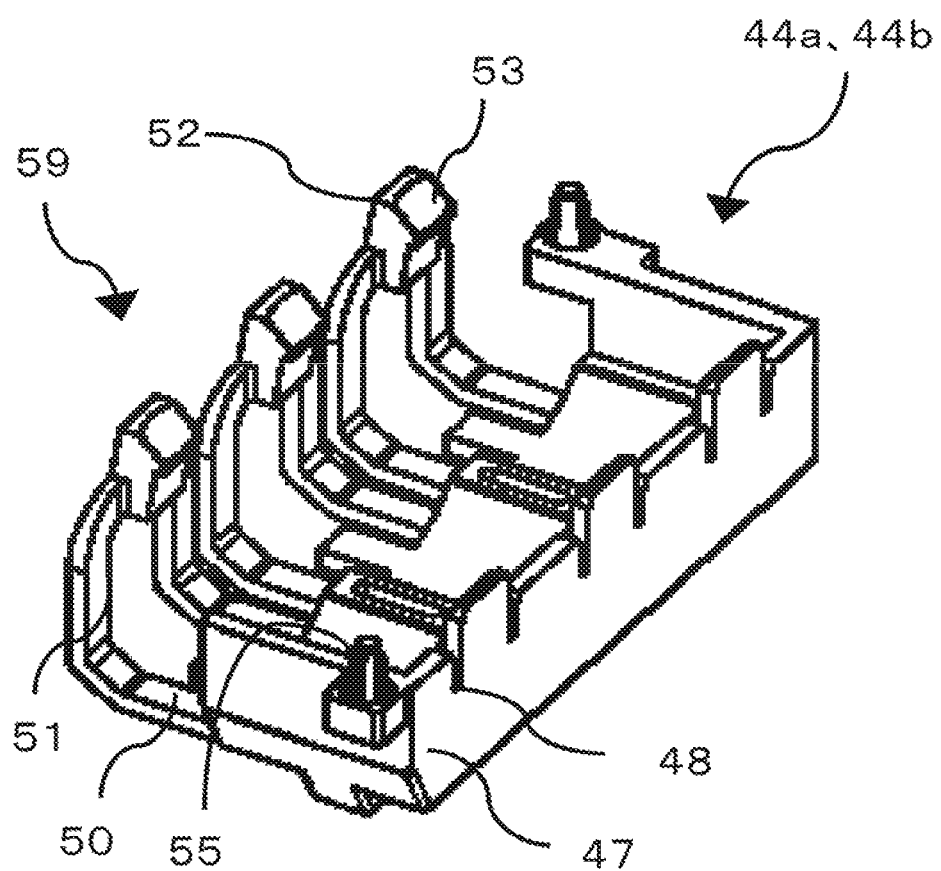
FIG. 4 is an external view of the inside of a capacitor holder in the electric rotating machine apparatus according to Embodiment 1.
Figure 5:
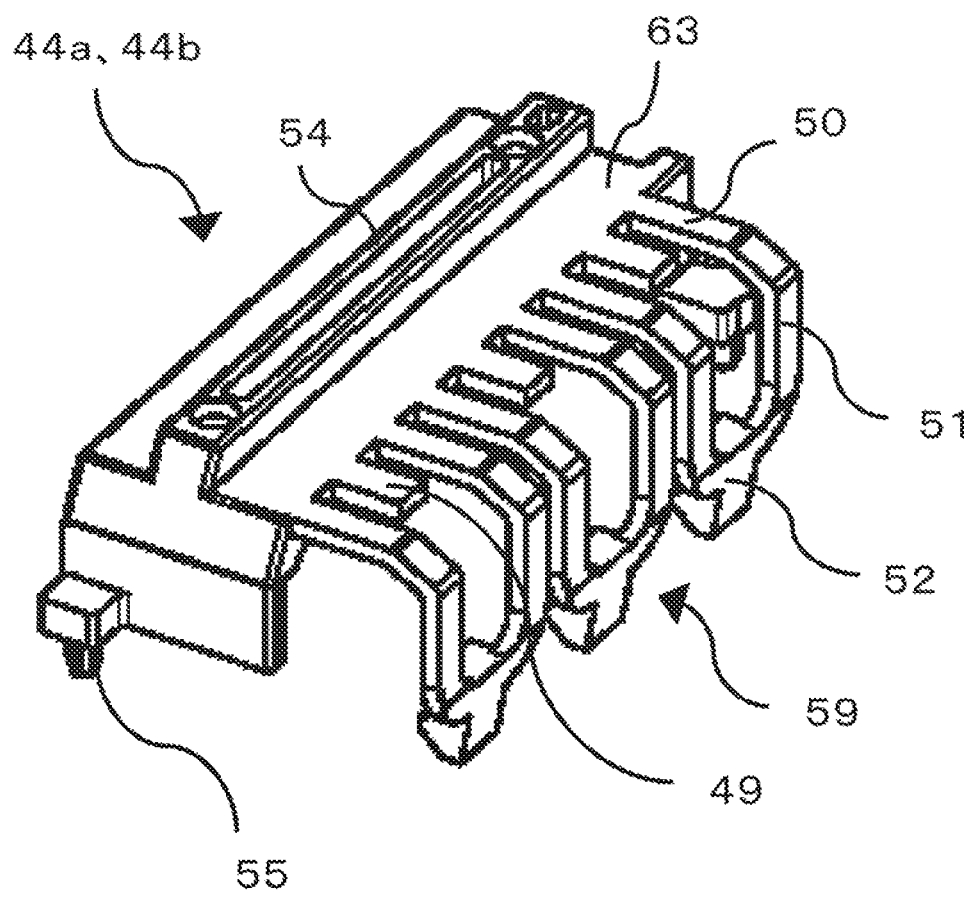
FIG. 5 is an external view of the outside of the capacitor holder in the electric rotating machine apparatus according to Embodiment 1.
Figure 6:
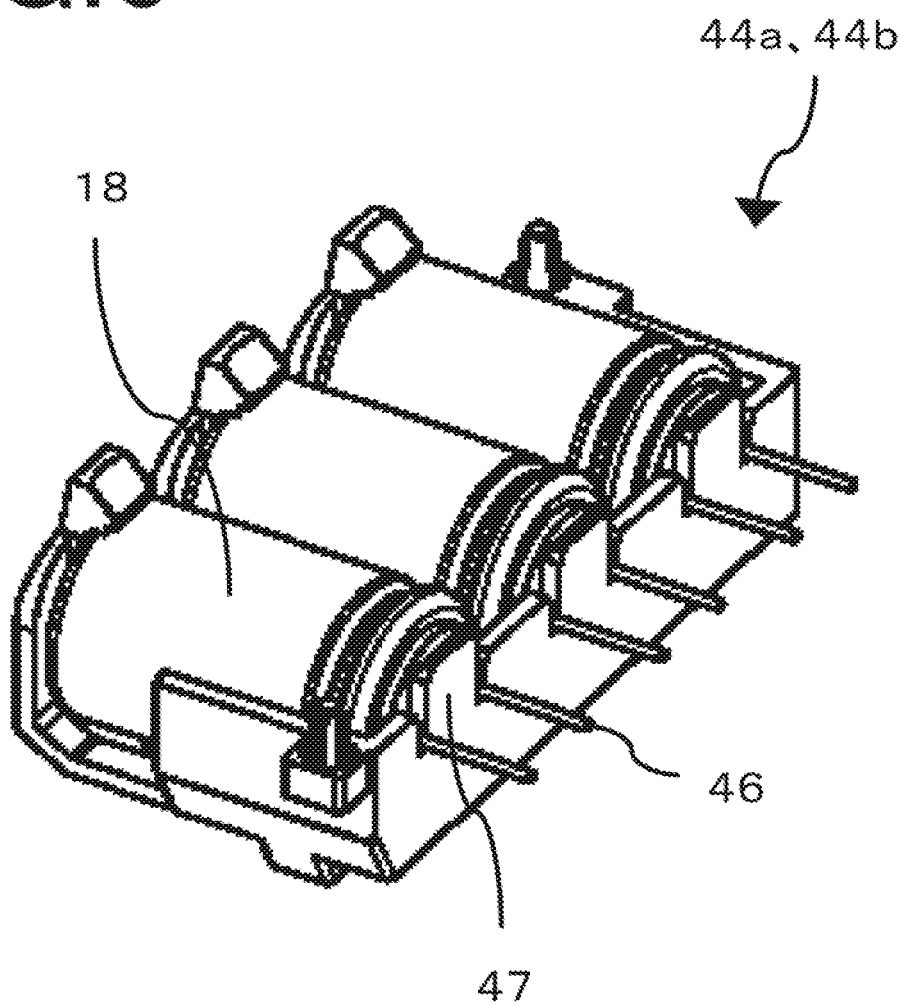
FIG. 6 is an external view of the inside of the capacitor holder in the electric rotating machine apparatus according to Embodiment 1, when capacitors are mounted in the capacitor holder.
Figure 7:
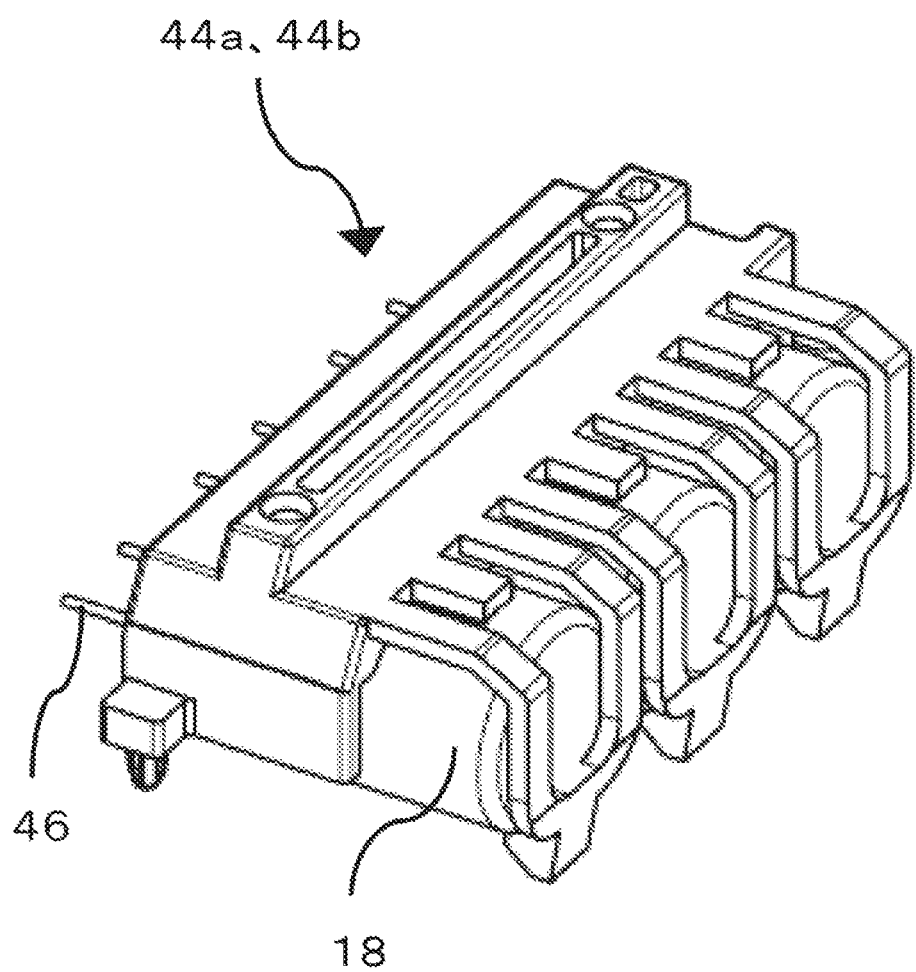
FIG. 7 is an external view of the outside of the capacitor holder in the electric rotating machine apparatus according to Embodiment 1, when the capacitors are mounted in the capacitor holder.
Figure 8:
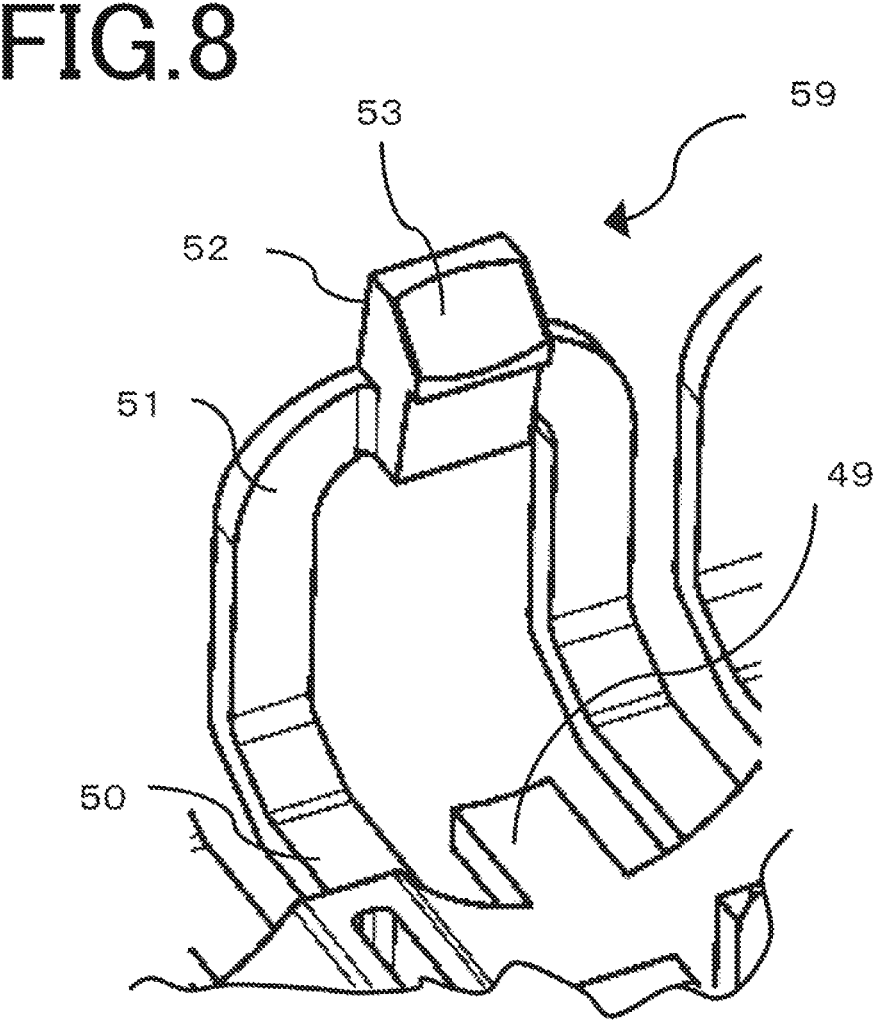
FIG. 8 is an external view of the inside of a snap fitting portion of the capacitor holder in the electric rotating machine apparatus according to Embodiment 1.
Figure 9:
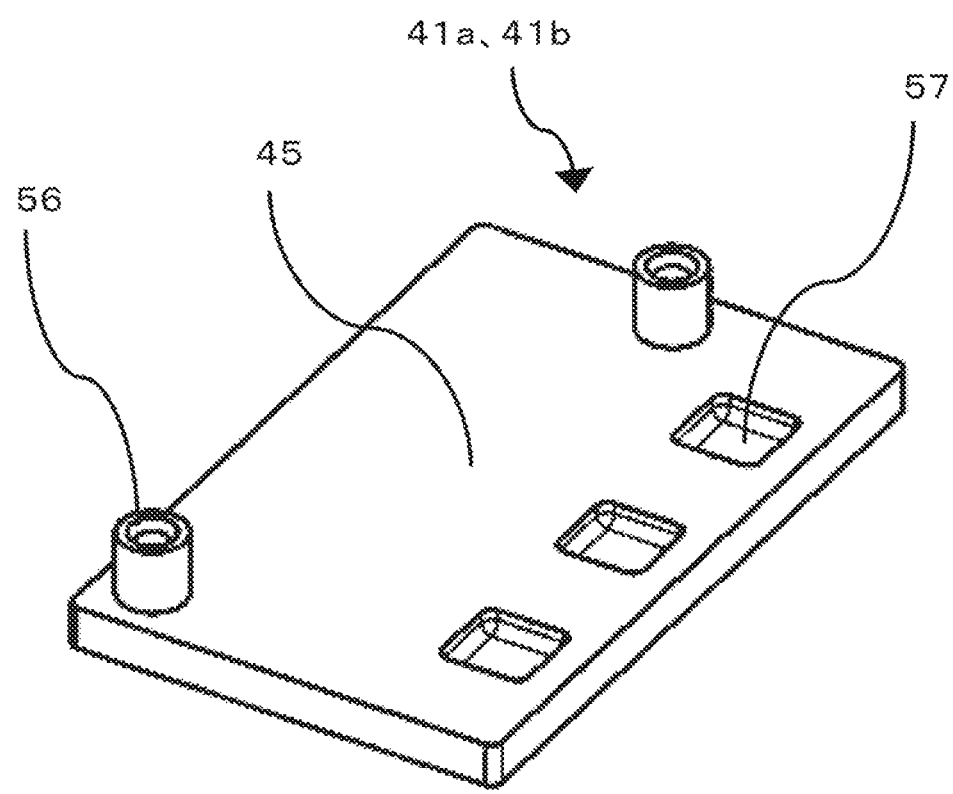
FIG. 9 is an external view of a bus-bar holder in the electric rotating machine apparatus according to Embodiment 1.

Hereinafter, an electric rotating machine apparatus 100 according to Embodiment 1 will be explained with reference to the drawings. FIG. 1 is a circuit diagram of an electric rotating machine apparatus 100 according to Embodiment 1. FIG. 2 is a cross-sectional view of the electric rotating machine apparatus 100 according to Embodiment 1. FIG. 3 is a perspective view of the electric rotating machine apparatus 100 according to Embodiment 1, when viewed from the top side. FIG. 4 is an external view of the inside of a capacitor holder 44a, 44b in the electric rotating machine apparatus 100 according to Embodiment 1. FIG. 5 is an external view of the outside of the capacitor holder 44a, 44b in the electric rotating machine apparatus 100 according to Embodiment 1. FIG. 6 is an external view of the inside of the capacitor holder 44a, 44b in the electric rotating machine apparatus 100 according to Embodiment 1, when smoothing capacitors 18 are mounted in the capacitor holder 44a, 44b. FIG. 7 is an external view of the outside of the capacitor holder 44a, 44b in the electric rotating machine apparatus 100 according to Embodiment 1, when the smoothing capacitors 18 are mounted in the capacitor holder 44a, 44b. FIG. 8 is an external view of the inside of a snap fitting portion 59 of the capacitor holder 44a, 44b in the electric rotating machine apparatus 100 according to Embodiment 1. FIG. 9 is an external view of a bus-bar holder 41a, 41b in the electric rotating machine apparatus 100 according to Embodiment 1.

<Circuit Configuration>

FIG. 1 is a circuit diagram of the electric rotating machine apparatus 100. Here, there will be shown an example in which the electric rotating machine apparatus 100 is utilized as an electric power steering apparatus. Each of the reference characters 1a and 1b denotes a control unit; the reference character 2 denotes an electric rotating machine provided with two sets of 3-phase windings. Because the control units 1a and 1b each have the same configuration and substantially the same components are mounted in each of them, only one of them will be explained.

The control unit 1a mainly includes a control circuit unit 4a in which a CPU 3a is mounted, a power module 5a having an inverter circuit for supplying an electric rotating machine 2 with a current, a power-relay switching device 6a, and a filter 7a. The power source +B and GND are connected with the control unit 1a from a battery 8. An ignition switch 9 turns on the power source through a power-source circuit 10a of the control circuit unit 4a. Moreover, for example, information items from a torque sensor, which is mounted in the vicinity of the handwheel and detects steering torque, a speed sensor, which detects the traveling speed of a vehicle, and the like are inputted to the control unit 1a from a sensor group 11.

The information items from the sensor group 11 are transmitted to the CPU 3a by way of an input circuit 12a of the control circuit unit 4a. Based on those information items, the CPU 3a calculates and outputs a current value, which is a control amount for rotating the electric rotating machine 2. This output signal is transmitted to the power module 5a having the inverter circuit by way of a driving circuit 13a included in an output circuit. When receiving a command signal from the CPU 3a, the driving circuit 13a in the output circuit outputs driving signals for driving respective switching devices in the power module 5a.

Because in the driving circuit 13a, only a small current flows, it is mounted in the control circuit unit 4a. However, the driving circuit 13a can be disposed also in the power module 5a. power module 5a has respective switching devices for a U winding, a V winding, and a W winding of the three phases of the electric rotating machine 2. The power module 5a mainly includes upper-arm switching devices 14Ua, 14Va, and 14Wa, lower-arm switching devices 15Ua, 15Va, and 15Wa, electric-rotating-machine relay switching devices 16Ua, 16Va, and 16Wa for connecting or disconnecting wiring leads to the electric-rotating-machine wirings, shunt resistors 17Ua, 17Va, and 17Wa for detecting respective currents, and smoothing capacitors 18Ua, 18Va, and 18Wa for suppressing noise.

Hereinafter, the upper-arm switching devices 14Ua, 14Va, and 14Wa including those in the control unit 1b will be referred to as a switching device 14. The lower-arm switching devices 15Ua, 15Va, and 15Wa including those in the control unit 1b will be referred to as a switching device 15. The electric-rotating-machine relay switching devices 16Ua, 16Va, and 16Wa including those in the control unit 1b will be referred to as a switching device 16. In addition, the smoothing capacitors 18Ua, 18Va, and 18Wa including those in the control unit 1b will be referred to as a smoothing capacitor 18.

Because having the same circuit configuration for each of the windings of the respective phases, the power module 5a can supply currents independently to the windings of the respective phases. In addition, each of the circle marks in the drawing denotes a connection terminal for connecting the control unit 1a or 1b with the outside.

The electric potential difference between the both ends of each of the shunt resistors 17Ua, 17Va, and 17Wa, the respective voltages at the electric-rotating-machine winding terminals, and the like are transmitted to the input circuit 12a. These information items are also inputted to the CPU 3a; the CPU 3a calculates the difference between the calculated current value and a detection value corresponding thereto and then performs feedback control. The control unit 1a can supply a desirable electric-rotating-machine current so as to assist steering power. Moreover, a driving signal for the power-relay switching device 6a that operates as a relay for performing power-source connection or power-source disconnection between the battery +B and the power module 5a is also outputted; thus, the switching device 6a can cut off supply of the current to the electric rotating machine 2.

The electric-rotating-machine relay switching devices 16Ua, 16Va, and 16Wa are also provided in the power module 5a and can cut off the respective phases. Because a large current flows therein and hence heat is generated, it may be allowed that the power-relay switching device 6a is contained in the power module 5a so as to be configured as part of the power module 5a. In addition, in order to suppress noise from being emitted due to PWM driving of the power module 5a, the filter 7a including smoothing capacitors 60a and 61a and a coil 62a is disposed near to the power source (+B, GND).

The control circuit unit 4a has an abnormality detection function in which from inputted information items, an abnormality in the driving circuit 13a, the power module 5a, the electric-rotating-machine winding, or the like, in addition to the sensor group 11, is detected; when an abnormality is detected, in order to cut off current supply, for example, only for a predetermined phase in accordance with the abnormality, the control circuit unit 4a turns off the corresponding-phase upper-arm switching device 14Ua, 14Va, 14Wa, the corresponding-phase lower-arm switching device 15Ua, 15Va, 15Wa and the corresponding-phase electric-rotating-machine relay switching device 16Ua, 16Va, 16Wa. Alternatively, it is also made possible that in order to cut off the power source itself, the power-relay switching device 6a is turned off.

Heretofore, the control unit 1a has been explained; because the control unit 1b is the same, the explanations for the respective units of the control unit 1b will be omitted. The CPU 3a of the control unit 1a and the CPU 3b of the control unit 1b are connected with each other through a communication line 19 so as to be able to interchange information items; in particular, when an abnormality is detected, the CPU 3a and the CPU 3b mutually perform communication including the contents of the abnormality so as to share the information items.

<Electric Rotating Machine>

The electric rotating machine 2 is a brushless electric rotating machine in which each of the two sets of three-phase windings is delta-connected. There is mounted rotation sensors 20a and 20b that detects, for the brushless electric rotating machine, the rotation position of the rotor. In order to secure the redundant system, two sets of sensors are mounted in each of the rotation sensors 20a and 20b; the rotation information items therefrom are transmitted to the input circuits 12a and 12b of the control circuit units 4a and 4b, respectively.

It may be allowed that the electric rotating machine 2 is not three-phase delta-connected brushless electric rotating machine but either a three-phase star-connected brushless electric rotating machine or an electric rotating machine having dipole-two-pair brushes. Moreover, as is the case with the winding specification of a conventional apparatus, either distributed winding or concentrated winding can be adopted. Furthermore, the electric rotating machine 2 may be a so-called tandem electric rotating machine having two stators. Even windings of one-set or two-set collaboration can be adopted, as long as the configuration can output desired motor rotation speed and torque. As described above, there is adopted the configuration in which two sets each of circuit networks, connectors, sensors, and the like are all independent, so that the redundancy is secured.

FIG. 2 is a cross-sectional view of the electric rotating machine apparatus 100 applied to an electric power steering apparatus; the reference numeral 1 denotes a control unit, and the reference numeral 2 denotes an electric rotating machine. As far as an apparatus integrated in such a manner is concerned, it is required that the maximum outer diameter of the control unit 1 is the same as or smaller than that of the electric rotating machine 2. Accordingly, a structure in which main units are erected in parallel with the output axle is adopted.

At first, the configuration of the electric rotating machine 2 will be explained by use of FIG. 2. The electric rotating machine 2 mainly includes an output axle 22, a rotor 23, and a stator 24 incorporated in a case 21.

Multi-phase, for example, 3-phase windings 25 are wound around and arranged in the stator 24. A ring-shaped wiring portion 26 with which the terminals of the windings 25 are connected and then extend to the control unit 1 is disposed close to the upper portion of the windings 25. Each of winding end portions 27a and 27b of the electric rotating machine penetrates a frame 28 from the ring-shaped wiring portion 26 and then extends into the control unit 1. Each of the winding end portions 27a and 27b that each include three windings are collectively extended to the periphery of the inner circumference of the control unit 1. Two or more permanent magnets are arranged around the rotor 23. Bearings 29a and 29b for making the output axle 22 rotate are arranged at the upper and lower sides, respectively, of the drawing. The bearing 29a closer to the control unit 1 in FIG. 2 is disposed at the center of the frame 28; the frame 28 makes the boundary between the electric rotating machine 2 and the control unit 1 and has the role of a cover for the electric rotating machine 2. An after-mentioned sensor rotor 30 is disposed at the anti-output-side end portion of the output axle 22.

<Control Unit>

Next, the configuration of the control unit 1 will be explained. The control unit 1 includes the control units 1a and 1b of two systems; the outer layer thereof is covered with a housing 31. At the anti-output-side endface thereof, there are arranged power-supply connectors 32a and 32b to be connected with the external power source (battery 8) and two or more signal connectors 33a and 33b to be connected with the sensor group 11. Relatively large components such as the filters 7a and 7b are mounted on a plane that is the same as the plane where the power-supply connectors 32a and 32b and the signal connectors 33a and 33b are arranged, that is opposite to the output axle 22, and that is perpendicular to the output axle.

Each of the power-supply connectors 32a and 32b is the one in which a relatively large current in the power source system flows; each of the signal connectors 33a and 33b is the one in which a relatively small signal-system current flows. In addition, two sets of connectors for the power-source system and the signal system are provided; however, it may be allowed that one set of connectors are divided into two sets in the control unit.

The columnar portion of a heat sink 34 is disposed in the housing 31. The control circuit units 4a and 4b, the power modules 5a and 5b included in the inverter circuit, and the like are arranged around the heat sink 34. A bottom portion 34a of the heat sink 34 has the shape of a circle inscribed in the case 21 of the electric rotating machine 2. The anti-output-side end of the output axle 22 is extended in the center thereof and the sensor rotor 30 is mounted on the anti-output-side end.

The sensor rotor 30 is one pair of or two or more pairs of magnetic rotors; on a plane facing the sensor rotor 30, the rotation sensors 20a and 20b are mounted on a circuit board 35. Rotation of the output axle 22 makes the sensor rotor 30 rotate and hence a change in the magnetic field occurs. The rotation sensors 20a and 20b independently detects the change in the magnetic field. It may be allowed that two sets of the rotation sensors 20a and 20b are incorporated in a single package. FIG. 2 illustrates a one-package configuration.

The respective power-source lines and the respective signal lines of the rotation sensors 20a and 20b are separated from each other through wiring strip conductors of the circuit board 35 and then are connected with the control circuit unit 4a and 4b, respectively. A hole is provided in the bottom side of the heat sink 34, and the circuit board 35 is fixed in such a way as to be enclosed by the hole. Accordingly, the circuit board 35 has a smaller area than each of the control circuit units 4a and 4b has. The sensor rotor 30 and the rotation sensors 20a and 20b have been explained as the magnetic-sensor types; however, they are not limited thereto, and it may be allowed that they are resolvers or Hall sensors.

FIG. 3 is a perspective view illustrating principal parts of the electric rotating machine apparatus 100, when viewed from the power-supply connectors 32a and 32b side. That is to say, FIG. 3 is a perspective view, when viewed from the top side. The heat sink 34 whose columnar portion is substantially a rectangular parallelepiped is disposed in the center, and the control circuit units 4a and 4b are arranged along the respective parallel two sides. The power modules 5a and 5b are arranged close to the respective adjacent two sides. Two pieces each of the control circuit units 4a and 4b and the power modules 5a and 5b are separated from each other and are independently arranged.

In order to connect respective signal terminals 36a and 36b of the power modules 5a and 5b with the control circuit units 4a and 4b, respectively, each of the control circuit units 4a and 4b has a shape extending to one side. With respect to the output axle 22, the heat sink 34 and the control circuit units 4a and 4b are arranged substantially in point symmetry; any one of the control circuit units 4a and 4b can be connected with any one of 3-phase winding end portions 27a and 27b.

Respective terminals U, V, and W of each of the winding end portions 27a and 27b are arranged toward the respective outer circumferential directions of the control circuit units 4a and 4b (the terminals U, V, and W are unillustrated). The winding end portions 27a and 27b are connected with output terminals 38a and 38b of the power modules 5a and 5b through extension terminals 37a and 37b, respectively.

Bus bar units 39a and 39b are mounted on the respective surfaces of the heat sink 34, on which the control circuit units 4a and 4b are mounted. The bus bar unit 39a, 39b includes a power-source-system bus bar 40a, 40b, the extension terminal 37a, 37b, and the bus-bar holder 41a, 41b for holding those members. The power-source-system bus bar 40a, 40b is a bus bar to be connected between the power source and GND.

A power-source line 42a, 42b is electrically connected with the control circuit unit 4a, 4b from the power-supply connector 32a, 32b. Various kinds of signal lines 43a and 43b are electrically connected with the control circuit units 4a and 4b from the signal connectors 33a and 33b, respectively. As the circuit diagram in FIG. 1 represents, after being connected with the uppermost filter 7a, 7b, the power-source line is connected with the power-source-system bus bar 40a, 40b and the extension terminal 37a, 37b. The signal line is inputted to the input circuit 12a, 12b of the control circuit unit 4a, 4b.

<Capacitor Holder, Bus-Bar Holder>

The capacitor holder 44a, 44b, the bus-bar holder 41a, 41b, and the smoothing capacitor 18 will be explained by use of FIGS. 4 through 9. The two or more smoothing capacitors 18 are contained in the capacitor holders 44a and 44b (in Embodiment 1, three pieces of smoothing capacitors 18 are contained in each of the capacitor holders 44a and 44b).

The capacitor holder 44a, 44b is disposed at the radial-direction outer side of the electric rotating machine 2 and the smoothing capacitors are assembled in a row in the axial direction of the electric rotating machine 2 in such a way as to be substantially parallel to a surface 45 of the bus-bar holder 41a, 41b, so that the smoothing capacitors 18 can compactly be fixed between the capacitor holder 44a, 44b and the bus-bar holder 41a, 41b and hence the vibration resistance is raised. The capacitor holder 44a, 44b in which the two or more smoothing capacitors 18 are arranged is assembled to the electric rotating machine apparatus 100, so that the assembly efficiency is improved.

The capacitor holder 44a, 44b holding the two or more smoothing capacitors 18 is fixed to the surface 45 of the bus-bar holder 41a, 41b in a substantially parallel manner through press-fitting, snap fitting, the adhesive 58, or the like. In Embodiment 1, a protruding portion 55 provided in the end portion of the capacitor holder 44a, 44b is inserted into a hole 56 provided in the end portion of the after-mentioned bus-bar holder 41a, 41b, so that the capacitor holder 44a, 44b is fixed thereto. Because the capacitor holder 44a, 44b is fixed to the bus-bar holder 41a, 41b, the smoothing capacitor 18 sandwiched therebetween is further robustly fixed and hence the vibration resistance is raised. In addition, fixation of the capacitor holder 44a, 44b to the bus-bar holder 41a, 41b makes the two or more smoothing capacitors 18 arranged in the capacitor holder 44a, 44b concurrently fixed; thus, the assembly efficiency is raised.

In the case where the capacitor holder 44a, 44b is adhered to the bus-bar holder 41a, 41b with the adhesive 58, the smoothing capacitor 18 sandwiched therebetween is further robustly fixed and hence the vibration resistance is raised. In addition, fixation utilizing the adhesive 58 requires neither a screwing process nor a press-fitting process and hence can also contribute to raising the assembly efficiency.

As illustrated in FIG. 2, the two or more longitudinally cylindrical tubular smoothing capacitors 18 are arranged in the output-axle direction in such a way that the longitudinal directions thereof are perpendicular to the output axle of the electric rotating machine 2. In addition, as illustrated in FIGS. 2 and 3, terminals 46 of the two or more smoothing capacitors 18 are connected with the respective power-source-system bus bars 40a, 40b in one and the same direction (in FIG. 2, in the left direction). By arranging the smoothing capacitors 18 with the respective terminals 46 thereof in the same direction, it is made possible to electrically connect the two or more smoothing capacitors 18 by use of one and the same power-source-system bus bar 40a, 40b; thus, it is efficient, it is made possible to connect the power-source-system bus bar 40a, 40b as short as possible, and hence the length of the power-source-system bus bar 40a, 40b can be shortened as much as possible; as a result, this arrangement method can contribute to enhancement of the downsizing, the cost reduction, and the assembly efficiency. As illustrated in FIG. 3, the capacitor holder 44a, 44b is disposed at the radial-direction outer side of the electric rotating machine 2 with respect to the two or more smoothing capacitors 18.

FIG. 4 illustrates the external view of the inside of the capacitor holder 44a, 44b; FIG. 5 illustrates the external view of the outside of the capacitor holder 44a, 44b; FIG. 6 illustrates the external view of the inside of the capacitor holder 44a, 44b at a time when the smoothing capacitors 18 are contained; FIG. 7 illustrates the external view of the outside of the capacitor holder 44a, 44b at a time when the smoothing capacitors 18 are contained.

The capacitor holder 44a, 44b is provided with a pressing portion 47, a terminal groove portion 48, and the snap fitting portion 59 for each of the smoothing capacitors 18. FIG. 8 illustrates an enlarged view of the snap fitting portion 59.

The respective center axes of the two or more smoothing capacitors 18 each formed in the shape of a longitudinal column are arranged along the circumferential direction of the electric rotating machine 2; the capacitor holder 44a, 44b has a main body portion 63 that is provided at a more radially outer side of the electric rotating machine 2 than the smoothing capacitor 18 is, the pressing portion 47 that extends from the main body portion 63 toward the radial-direction inner side of the electric rotating machine 2, at the terminal 46 side, which is one axial-direction side of the smoothing capacitor 18, and the snap fitting portion 59 that extends from the main body portion 63 toward the radial-direction inner side of the electric rotating machine 2, at the anti-terminal 46 side, which is the other axial-direction side of the smoothing capacitor 18.

While the main body portion 63 of the capacitor holder 44a, 44b supports the cylindrical tubular surface of the smoothing capacitor 18 from the radial-direction outer side of the electric rotating machine 2, the pressing portion 47 and the snap fitting portion 59 pinch the smoothing capacitor 18, so that the smoothing capacitors 18 can readily be arranged in the capacitor holder 44a, 44b. Because the pressing portion 47 and the snap fitting portion 59 press and fix the smoothing capacitor 18 while the main body portion 63 supports the cylindrical tubular surface of the smoothing capacitor 18, the capacitor can be fixed with a high vibration resistance.

The snap fitting portion 59 includes two beam portions 50 that each extend in such a way as to be parallel to the longitudinal direction of the smoothing capacitor 18, a U-shaped beam portion 51 that is formed at the front end of the beam portion 50 in such a way as to be folded in the same direction as the pressing portion 47 is and in such a way as to avoid the central portion, at the anti-terminal 46 side (at the explosion proof valve), of the smoothing capacitor 18, and a hook portion 52 provided at the front end of the U-shaped beam portion 51.

In other words, the snap fitting portion 59 has the two U-shaped beam portions 51 that each extend in the direction opposite to the axial-direction terminal 46 of the smoothing capacitor 18, along the main body portion 63, which is the part of the outer circumferential surface, at the radial-direction outer side of the electric rotating machine 2, of the smoothing capacitor 18, and then each extend, at the side opposite to the axial-direction terminal 46 of the smoothing capacitor 18, toward the radial-direction inner side of the electric rotating machine 2, avoiding the center axis of the smoothing capacitor, a connection portion that connects the respective front ends of the two U-shaped beam portions 51, and the hook portion 52 provided in the connection portion.

Because the smoothing capacitor 18 is fixed by the hook portion 52 provided in the connection portion that connects the respective front ends of the two U-shaped beam portions 51 that each extend toward the radial-direction inner side of the electric rotating machine 2, avoiding the center axis of the smoothing capacitor 18, the explosion proof portion of the smoothing capacitor 18 is not sealed; thus, it is made possible that the smoothing capacitor 18 is fixed in an explosion-proof manner.

A guide groove portion 53 recessed in a concave shape is provided in the top surface of the hook portion 52. A bearing portion 49 is provided in the center of the two beam portions 50. The bearing portion 49 for the smoothing capacitor 18 is extended in the longitudinal direction of the smoothing capacitor 18, so that the smoothing capacitor 18 can be assembled in the axial direction thereof without being inclined. Moreover, because the beam portions 50 are formed from the both sides of the bearing portion 49, there is obtained a structure in which the snap fitting portion 59 is readily bent when the smoothing capacitor 18 is assembled; thus, it is made possible to prevent the capacitor holder 44a, 44b from being broken.

The guide groove portion 53 has a shape with which it becomes along the outer shape of the smoothing capacitor 18 at a time when the smoothing capacitor 18 is assembled to the capacitor holder 44a, 44b. In Embodiment 1, the guide groove portion 53 has a shape with which it becomes along the side surface (curved surface) of the cylindrical columnar smoothing capacitor 18. For example, the shape is similar to a recess to be formed when the side surface (curved surface) of a predetermined cylindrical column is pressed onto a soft object such as clay.

When being assembled to the capacitor holder 44a, 44b, the smoothing capacitor 18 is inserted thereinto in such a way that the outer shape of the smoothing capacitor 18 becomes along the guide groove portion 53, so that the smoothing capacitor 18 can readily be fixed; thus, the assembly efficiency is raised.

The terminal groove portion 48 through which the terminal 46 of the smoothing capacitor 18 passes exists in the pressing portion 47 of the capacitor holder 44a, 44b. The terminal 46 of the smoothing capacitor 18 is inserted into the terminal groove portion 48 provided in the pressing portion 47, so that the position of the terminal 46 is fixed; thus, it is made possible to suppress the smoothing capacitor 18 from being assembled in a rotated manner. Because there can be eliminated a stress that is exerted on the connection portion between the terminal 46 of the smoothing capacitor 18 and the power-source-system bus bar 40a, 40b when the smoothing capacitor 18 is assembled in a rotated manner, the durability is raised. Moreover, because it is not required to ascertain whether or not the position of the smoothing capacitor 18 is rotated and to correct the position, the assembly efficiency is raised.

The terminal 46 of the smoothing capacitor 18 is inserted into the terminal groove portion 48, and the pressing portion 47 and the snap fitting portion 59 pinch the smoothing capacitor 18. At the anti-terminal 46 side (at the explosion proof valve) of the smoothing capacitor 18, the hook portion 52 makes contact with the smoothing capacitor 18, so that a space is created between the U-shaped beam portions 51 and the explosion proof valve of the smoothing capacitor 18 and the smoothing capacitor 18 is held therein. The U-shaped beam portions 51 are formed in such a way as to avoid the central portion of the anti-terminal 46 side (the explosion proof valve side) of the smoothing capacitor 18, so that the smoothing capacitor 18 can be held in such a way that only the hook portion 52 makes contact with the smoothing capacitor 18. As a result, it is made possible to provide a space between the U-shaped beam portions 51 and the smoothing capacitor 18, and hence it is made possible to fix the smoothing capacitor 18 without sealing the explosion proof valve of the smoothing capacitor 18.

It may be allowed that the two or more smoothing capacitor 18 are fixed to the capacitor holder 44a, 44b by use of the adhesive 58. By being fixed with the adhesive 58, the two or more smoothing capacitors 18 are more robustly fixed to the capacitor holder 44a, 44b; thus, the vibration resistance is raised. In addition, fixation utilizing the adhesive 58 requires neither a screwing process nor a press-fitting process and hence can also contribute to raising the assembly efficiency.

A rib 54 is provided at the side of the capacitor holder 44a, 44b opposite to the portion thereof in which the smoothing capacitor 18 is contained. The capacitor holder 44a, 44b can readily be held by providing the rib 54. The assembly efficiency is raised at a time when the smoothing capacitor 18 is assembled to the capacitor holder 44a, 44b and at a time when the capacitor holder 44a, 44b is assembled to the bus-bar holder 41a, 41b. Furthermore, because the strength of the capacitor holder 44a, 44b itself is enhanced by providing the rib 54, it is made possible to suppress deformation thereof at a time of assemble; thus, the assembly accuracy is raised. The rise in the rigidity of the capacitor holder 44a, 44b enhances the vibration resistance.

The capacitor holder 44a, 44b has the protruding portion 55 for assembling the capacitor holder 44a, 44b to the bus-bar holder 41a, 41b. FIG. 9 illustrates the external view of the bus-bar holder 41a, 41b.

In the end portion of the bus-bar holder 41a, 41b, there is provided the hole 56 with which the protruding portion 55 at the end portion of the capacitor holder 44a, 44b engages. The capacitor holder 44a, 44b is fixed to the bus-bar holder 41a, 41b by inserting the protruding portion 55 into the hole 56.

Each of the bus-bar holder 41a, 41b and the capacitor holder 44a, 44b may be created by molding resin. Part of the protruding portion 55, the maximum outer diameter of which is larger than the hole diameter of the hole 56, is formed, so that it is made possible to fix the capacitor holder 44a, 44b by pressing the protruding portion 55 into the hole 56. In addition, each of the bus-bar holder 41a, 41b and the capacitor holder 44a, 44b may be formed of metal. By adjusting the outer diameter of the protruding portion 55 and the inner diameter of the hole 56, the protruding portion 55 and the hole 56 can be fixed through press-fitting under the condition of transition fitting or tight fitting. The protruding portion 55 is fixed by being inserted into the hole 56, so that the capacitor holder 44a, 44b can be more robustly fixed to the bus-bar holder 41a, 41b at an accurate position; thus, this method can contribute to enhancing not only the vibration resistance but the assembly efficiency.

The bus-bar holder 41a, 41b is provided with a recessed portion 57 that houses the hook portion 52 of the capacitor holder 44a, 44b. It is made possible that when the capacitor holder 44a, 44b is assembled to the bus-bar holder 41a, 41b, the hook portion 52 can be prevented from interfering with the bus-bar holder 41a, 41b. Accordingly, the assembly can be prevented from being hindered.

It may be allowed that the surface of the bus-bar holder 41a, 41b is coated with the adhesive 58 and then the smoothing capacitor 18 is fixed to the bus-bar holder 41a, 41b through the intermediary of the adhesive 58. It is made possible that from the center line of the output axle of the electric rotating machine 2 toward the radially outside, the bus-bar holder 41a, 41b, the adhesive 58, the smoothing capacitor 18,1 and the capacitor holder 44a, 44b can be arranged in that order. Accordingly, it is made possible to realize an electric rotating machine in which the smoothing capacitor 18 is strongly held and that has a high vibration resistance and a superior assembly efficiency. In addition, the foregoing description has explained that the bus-bar holder 41a, 41b, the adhesive 58, the smoothing capacitor 18, and the capacitor holder 44a, 44b are arranged in that order; however, it may be allowed that after making contact with each other, the bus-bar holder 41a, 41b and the smoothing capacitor 18 are fixed to each other with the adhesive 58. It is made possible that the smoothing capacitors 18 preliminarily inserted into the capacitor holder 44a, 44b are collectively assembled to the bus-bar holder 41a, 41b. In comparison with the process in which the smoothing capacitors 18 are individually assembled to the bus-bar holder 41a, 41b coated with the adhesive 58, the assembly efficiency is raised; concurrently, because the coating state of the adhesive 58 is stabilized, the vibration resistance is enhanced.

It may be allowed that the recessed portion 57 in the surface 45 of the bus-bar holder 41a, 41b is coated with the adhesive 58. As a result, the adhesive 58 fixes the hook portion 52 in the recessed portion 57. As a result, the bus-bar holder 41a, 41b and the capacitor holder 44a, 44b can be more robustly fixed to each other; therefore, it is made possible to realize an electric rotating machine in which the smoothing capacitor 18 is strongly held and that has a high vibration resistance and a superior assembly efficiency.

In the surface 45 of the bus-bar holder 41*a*, 41*b*, there may be formed a groove whose shape is along the contour of the smoothing capacitor 18, at the position therein that faces the smoothing capacitor 18 at a time when the smoothing capacitor 18 is assembled to the bus-bar holder 41*a*, 41*b* (unillustrated). Alternatively, it may be allowed that at the position, in the surface 45, that faces the smoothing capacitor 18, a portion protruding from the surface 45 toward the smoothing capacitor 18 is provided and that a groove whose shape is along the contour of the smoothing capacitor 18 is formed in the foregoing portion (unillustrated). This is because the formation of the surface 45 of the bus-bar holder 41*a*, 41*b* along the contour of the smoothing capacitor 18 makes it possible that the bus-bar holder 41*a*, 41*b* more robustly holds the smoothing capacitor 18 and hence the vibration resistance is raised.

As described above, with regard to an electric power steering apparatus having two pieces each of independent electric-rotating-machine wirings and electric-rotating-machine driving circuits, it is made possible to provide an apparatus that has a high vibration resistance and an excellent product-assembly efficiency.

Effect of Embodiment 1

(a) The electric rotating machine apparatus 100 according to Embodiment 1 includes
the electric rotating machine 2 having the windings 25 and the output axle 22,
the power modules 5*a*, 5*b* having the switching devices 14, 15, and 16 connected with the windings 25,
The power-source-system bus bar 40*a*, 40*b* that is held by the bus-bar holder 41*a*, 41*b* and is included in a power-supply path to the power module 5*a*, 5*b*,
the two or more smoothing capacitors 18 connected with the power-source-system bus bar 40*a*, 40*b*, and
the capacitor holder 44*a*, 44*b* in which at a more outer side in the radial direction of the electric rotating machine 2 than the bus-bar holder 41*a*, 41*b* is, the two or more smoothing capacitors 18 are arranged in the axial direction of the electric rotating machine 2, and that holds the two or more smoothing capacitors 18 from the outer circumferential side of the electric rotating machine 2.

The capacitor holder 44*a*, 44*b* is disposed at the radial-direction outer side of the electric rotating machine 2 and the smoothing capacitors are assembled in a row in such a way as to be substantially parallel to the surface 45 of the bus-bar holder 41*a*, 41*b*, so that the smoothing capacitors 18 can compactly be fixed between the capacitor holder 44*a*, 44*b* and the bus-bar holder 41*a*, 41*b* and hence the vibration resistance is raised. The capacitor holder 44*a*, 44*b* in which the two or more smoothing capacitors 18 are arranged is assembled to the electric rotating machine apparatus 100, so that the assembly efficiency is improved.

(b) In the electric rotating machine apparatus 100 according to Embodiment 1, the respective center axes of the two or more smoothing capacitors 18 each formed in the shape of a column are arranged along the circumferential direction of the electric rotating machine 2.

The large-capacity longitudinally cylindrical tubular smoothing capacitors 18 are arranged in a row in the axial direction of the electric rotating machine, in such a way that the respective center axes of the smoothing capacitors 18 are along the circumferential direction of the electric rotating machine 2; therefore, the smoothing capacitors 18 can compactly be fixed between the capacitor holder 44*a*, 44*b* and the bus-bar holder 41*a*, 41*b* and hence the vibration resistance is raised.

(c) In the electric rotating machine apparatus 100 according to Embodiment 1, the capacitor holder 44*a*, 44*b* is fixed to the bus-bar holder 41*a*, 41*b*.

Because the capacitor holder 44*a*, 44*b* is fixed to the bus-bar holder 41*a*, 41*b*, the smoothing capacitor 18 sandwiched therebetween is further robustly fixed and hence the vibration resistance is raised. In addition, fixation of the capacitor holder 44*a*, 44*b* to the bus-bar holder 41*a*, 41*b* makes the two or more smoothing capacitors 18 arranged in the capacitor holder 44*a*, 44*b* concurrently fixed; thus, the assembly efficiency is raised.

(d) In the electric rotating machine apparatus 100 according to Embodiment 1, the bus-bar holder 41*a*, 41*b* has the hole 56 or the protruding portion 55 in the end portion thereof; the capacitor holder 44*a*, 44*b* has the protruding portion 55 or the hole 56 in the end portion thereof; the protruding portion 55 is inserted into the hole 56, so that the bus-bar holder 41*a*, 41*b* and the capacitor holder 44*a*, 44*b* are fixed to each other.

The protruding portion 55 is fixed by being inserted into the hole 56, so that the capacitor holder 44*a*, 44*b* can be more robustly fixed to the bus-bar holder 41*a*, 41*b* at an accurate position; thus, this method can contribute to enhancing not only the vibration resistance but the assembly efficiency.

(e) In the electric rotating machine apparatus 100 according to Embodiment 1, the capacitor holder 44*a*, 44*b* has
the pressing portion 47 that is provided at the terminal 46 side of the smoothing capacitor 18 connected with the power-source-system bus bar 40*a*, 40*b* and to which the smoothing capacitor 18 is pressed, and
the snap fitting portion 59 that is provided at the side opposite to the pressing portion 47 side across the smoothing capacitor 18 and that fixes the smoothing capacitor 18.

The smoothing capacitor 18 can readily be disposed in the capacitor holder 44*a*, 44*b* by being pinched between the pressing portion 47 and the snap fitting portion 59. Because the pressing portion 47 and the snap fitting portion 59 press and fix the smoothing capacitor 18, the vibration resistance can be raised.

(f) In the electric rotating machine apparatus 100 according to Embodiment 1, the terminal groove portion 48 through which the terminal 46 of the smoothing capacitor 18 passes is provided in the pressing portion 47 of the capacitor holder 44*a*, 44*b*.

Because the terminal 46 of the smoothing capacitor 18 is inserted into the terminal groove portion 48 of the capacitor holder 44*a*, 44*b*, and the pressing portion 47 and the snap fitting portion 59 pinch the smoothing capacitor 18 so that the smoothing capacitor 18 is fixed to the capacitor holder 44*a*, 44*b*, the position of the terminal 46 is fixed, so that it is made possible to suppress the smoothing capacitor 18 from being assembled in a rotated manner. Because there can be eliminated a stress that is exerted on the connection portion between the terminal 46 of the smoothing capacitor 18 and the power-source-system bus bar 40*a*, 40*b* when the smoothing capacitor 18 is assembled in a rotated manner, the durability is raised. Because it is not required to ascertain whether or not the position of the smoothing capacitor 18 is rotated and to correct the position, the assembly efficiency is raised.

(g) In the electric rotating machine apparatus 100 according to Embodiment 1, the respective center axes of the two or more smoothing capacitors 18 each formed in the shape of a column are arranged along the circumferential direction of the electric rotating machine 2; the capacitor holder 44a, 44b has the main body portion 63 that is provided at a more radially outer side of the electric rotating machine 2 than the smoothing capacitor 18 is, the pressing portion 47 that extends from the main body portion 63 toward the radial-direction inner side of the electric rotating machine 2, at one axial-direction side of the smoothing capacitor 18, and the snap fitting portion 59 that extends from the main body portion 63 toward the radial-direction inner side of the electric rotating machine 2, at the other axial-direction side of the smoothing capacitor 18.

While the main body portion 63 of the capacitor holder 44a, 44b supports the cylindrical tubular surface of the smoothing capacitor 18 from the radial-direction outer side of the electric rotating machine 2, the pressing portion 47 and the snap fitting portion 59 pinch the smoothing capacitor 18, so that the smoothing capacitors 18 can readily be arranged in the capacitor holder 44a, 44b. Because the pressing portion 47 and the snap fitting portion 59 press and fix the smoothing capacitor 18 while the main body portion 63 supports the cylindrical tubular surface of the smoothing capacitor 18, the vibration resistance can be raised.

(h) In the electric rotating machine apparatus 100 according to Embodiment 1, the respective center axes of the two or more smoothing capacitors 18 each formed in the shape of a column are arranged along the circumferential direction of the electric rotating machine 2; the pressing portion 47 is provided at the one axial-direction side of the smoothing capacitor 18; the snap fitting portion 59 is provided at the other axial-direction side of the smoothing capacitor 18; the snap fitting portion 59 includes the two U-shaped beam portions 51 that each extend in the other axial-direction side of the smoothing capacitor 18, along the main body portion 63, which is the part of the outer circumferential surface, at the radial-direction outer side of the electric rotating machine 2, of the smoothing capacitor 18, and then each extend, at the other axial-direction side of the smoothing capacitor 18, toward the radial-direction inner side of the electric rotating machine 2, avoiding the center axis of the smoothing capacitor, a connection portion that connects the respective front ends of the two U-shaped beam portions 51, and the hook portion 52 provided in the connection portion.

While the main body portion 63 of the capacitor holder 44a, 44b supports the cylindrical tubular surface of the smoothing capacitor 18 from the radial-direction outer side of the electric rotating machine 2, the pressing portion 47 and the snap fitting portion 59 pinch the smoothing capacitor 18, so that the smoothing capacitors 18 can readily be arranged in the capacitor holder 44a, 44b. Because the pressing portion 47 and the snap fitting portion 59 press and fix the smoothing capacitor 18 while the main body portion 63 supports the cylindrical tubular surface of the smoothing capacitor 18, the vibration resistance can be raised. Because the smoothing capacitor 18 is fixed by the hook portion 52 provided in the connection portion that connects the respective front ends of the two U-shaped beam portions 51 that each extend toward the radial-direction inner side of the electric rotating machine 2, avoiding the center axis of the smoothing capacitor 18, the explosion proof portion of the smoothing capacitor 18 is not sealed; thus, it is made possible that the smoothing capacitor 18 is fixed in an explosion-proof manner.

(i) In the electric rotating machine apparatus 100 according to Embodiment 1, the capacitor holder 44a, 44b has the bearing portion 49 that extends in the axial direction of the smoothing capacitor 18 and supports the outer circumferential surface of the smoothing capacitor 18, at a space between the two beam portions 50 that each extend along the outer circumferential surface of the smoothing capacitor 18.

The bearing portion 49 for the smoothing capacitor 18 is extended in the longitudinal direction of the smoothing capacitor 18, so that the smoothing capacitor 18 can be assembled in the axial direction thereof without being inclined. Moreover, because the beam portions 50 are formed from the both sides of the bearing portion 49, there is obtained a structure in which the snap fitting portion 59 is readily bent when the smoothing capacitor 18 is assembled; thus, it is made possible to prevent the capacitor holder 44a, 44b from being broken.

(j) In the electric rotating machine apparatus 100 according to Embodiment 1, each of the two U-shaped beam portions 50, 51 and the connection portion does not abut on the smoothing capacitor 18, but the hook portion 52 abuts on and holds the smoothing capacitor 18.

The U-shaped beam portions 51 are formed in such a way as to avoid the central portion of the anti-terminal 46 side (the explosion proof valve side) of the smoothing capacitor 18, so that the smoothing capacitor 18 can be held in such a way that only the hook portion 52 makes contact with the smoothing capacitor 18. As a result, it is made possible to provide a space between the U-shaped beam portions 51 and the smoothing capacitor 18, and hence it is made possible to fix the smoothing capacitor 18 without sealing the explosion proof valve of the smoothing capacitor 18.

(k) In the electric rotating machine apparatus 100 according to Embodiment 1, the hook portion 52 of the capacitor holder 44a, 44b is provided with the guide groove portion 53 into which the end portion, at the anti-terminal 46 side, of the smoothing capacitor 18 is inserted in a sliding manner, at a time when the smoothing capacitor 18 is mounted.

When being assembled to the capacitor holder 44a, 44b, the smoothing capacitor 18 is inserted thereinto in such a way that the outer shape of the smoothing capacitor 18 becomes along the guide groove portion 53, so that the assembly efficiency is raised.

(l) In the electric rotating machine apparatus 100 according to Embodiment 1, the bus-bar holder 41a, 41b is provided with the recessed portion 57 that houses the hook portion 52 of the capacitor holder 44a, 44b.

The bus-bar holder 41a, 41b is provided with a recessed portion 57 that houses the hook portion 52 of the capacitor holder 44a, 44b. It is made possible that when the capacitor holder 44a, 44b is assembled to the bus-bar holder 41a, 41b, the hook portion 52 can be prevented from interfering with the bus-bar holder 41a, 41b. Accordingly, the assembly can be prevented from being hindered.

(m) In the electric rotating machine apparatus 100 according to Embodiment 1, the capacitor holder 44a, 44b is provided with the rib 54 at the anti-smoothing capacitor 18 side.

The capacitor holder 44a, 44b can readily be held by providing the rib 54 at the side, opposite to the containing portion for the smoothing capacitor 18, of the capacitor holder 44a, 44b. The assembly efficiency is raised at a time when the smoothing capacitor 18 is assembled to the capacitor holder 44a, 44b and at a time when the capacitor holder 44a, 44b is assembled to the bus-bar holder 41a, 41b. Furthermore, because the strength of the capacitor holder 44a, 44b itself is enhanced by providing the rib 54, it is made possible to suppress deformation thereof at a time of assemble; thus, the assembly accuracy is raised. The rise in the rigidity of the capacitor holder 44a, 44b enhances the vibration resistance.

(n) In the electric rotating machine apparatus 100 according to Embodiment 1, the two or more smoothing capacitors 18 are assembled to the capacitor holder 44a, 44b in such a way that the respective directions of the terminals 46 are one and the same.

By arranging the smoothing capacitors 18 with the respective terminals 46 thereof in the same direction, it is made possible to electrically connect the two or more smoothing capacitors 18 by use of one and the same power-source-system bus bar 40a, 40b; thus, it is efficient, it is made possible to connect the power-source-system bus bar 40a, 40b as short as possible, and hence the length of the power-source-system bus bar 40a, 40b can be shortened as much as possible; as a result, this arrangement method can contribute to enhancement of the downsizing, the cost reduction, and the assembly efficiency.

(o) In the electric rotating machine apparatus 100 according to Embodiment 1, the capacitor holder 44a, 44b can also be fixed to the bus-bar holder 41a, 41b through the intermediary of the adhesive 58.

Because the capacitor holder 44a, 44b is adhered to the bus-bar holder 41a, 41b with the adhesive 58, the smoothing capacitor 18 sandwiched therebetween is further robustly fixed and hence the vibration resistance is raised. In addition, fixation utilizing the adhesive 58 requires neither a screwing process nor a press-fitting process and hence can also contribute to raising the assembly efficiency.

(p) In the electric rotating machine apparatus 100 according to Embodiment 1, the smoothing capacitor 18 can also be fixed to at least one of the capacitor holder 44a, 44b and the bus-bar holder 41a, 41b through the intermediary of the adhesive 58.

Because the smoothing capacitor 18 is fixed to at least one of the capacitor holder 44a, 44b and the bus-bar holder 41a, 41b through the intermediary of the adhesive 58, the two or more smoothing capacitors 18 are robustly fixed by one of or both of the capacitor holder 44a, 44b and the bus-bar holder 41a, 41b and hence the vibration resistance is raised. In addition, fixation utilizing the adhesive 58 requires neither a screwing process nor a press-fitting process and hence can also contribute to raising the assembly efficiency.

2. Embodiment 2

Figure 10:
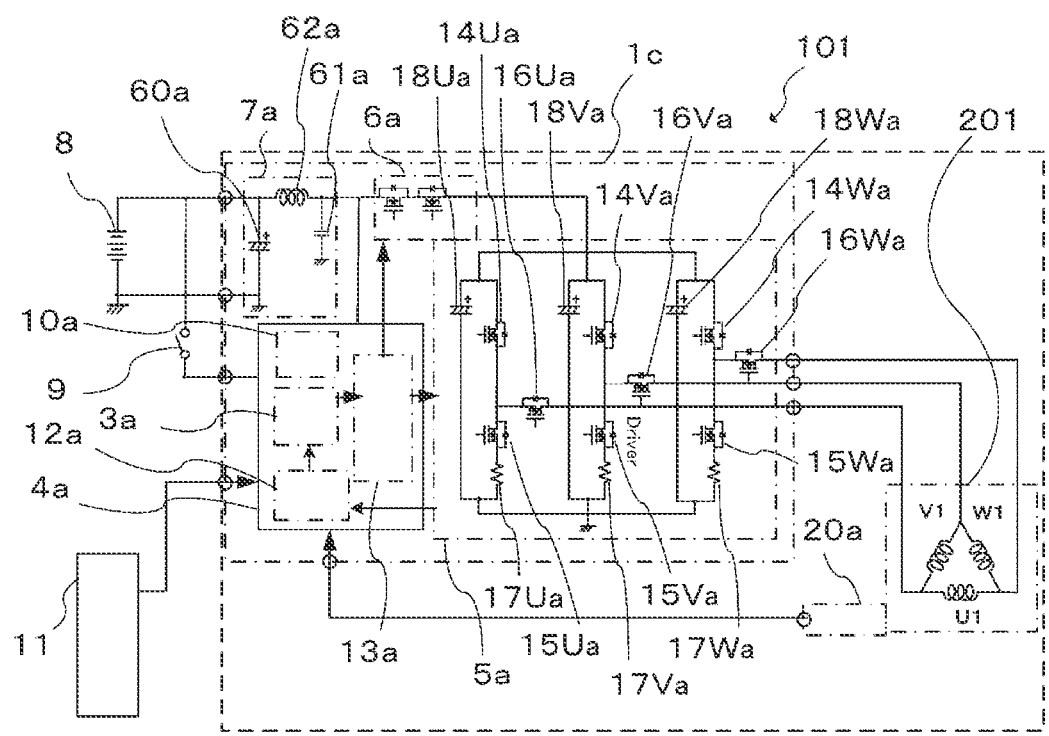
FIG. 10 is a circuit diagram of an electric rotating machine apparatus according to Embodiment 2.
Figure 11:
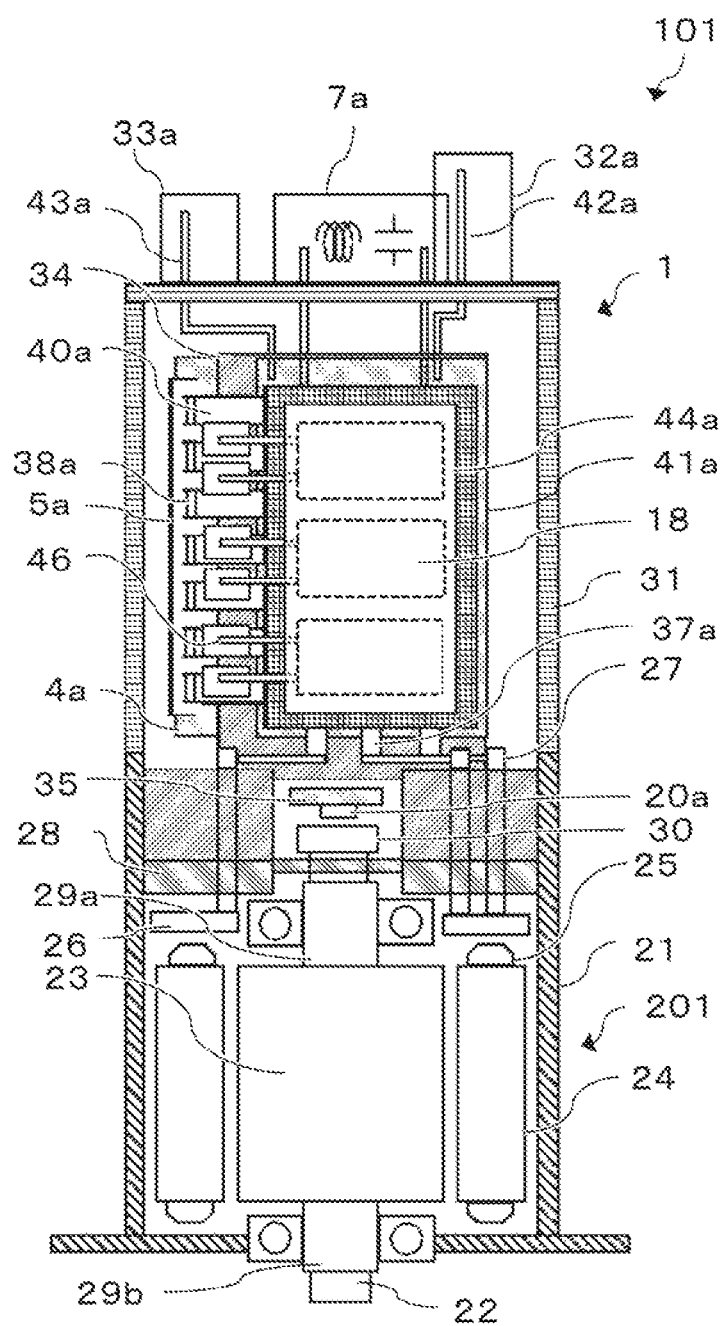
FIG. 11 is a cross-sectional view of the electric rotating machine apparatus according to Embodiment 2.
Figure 12:
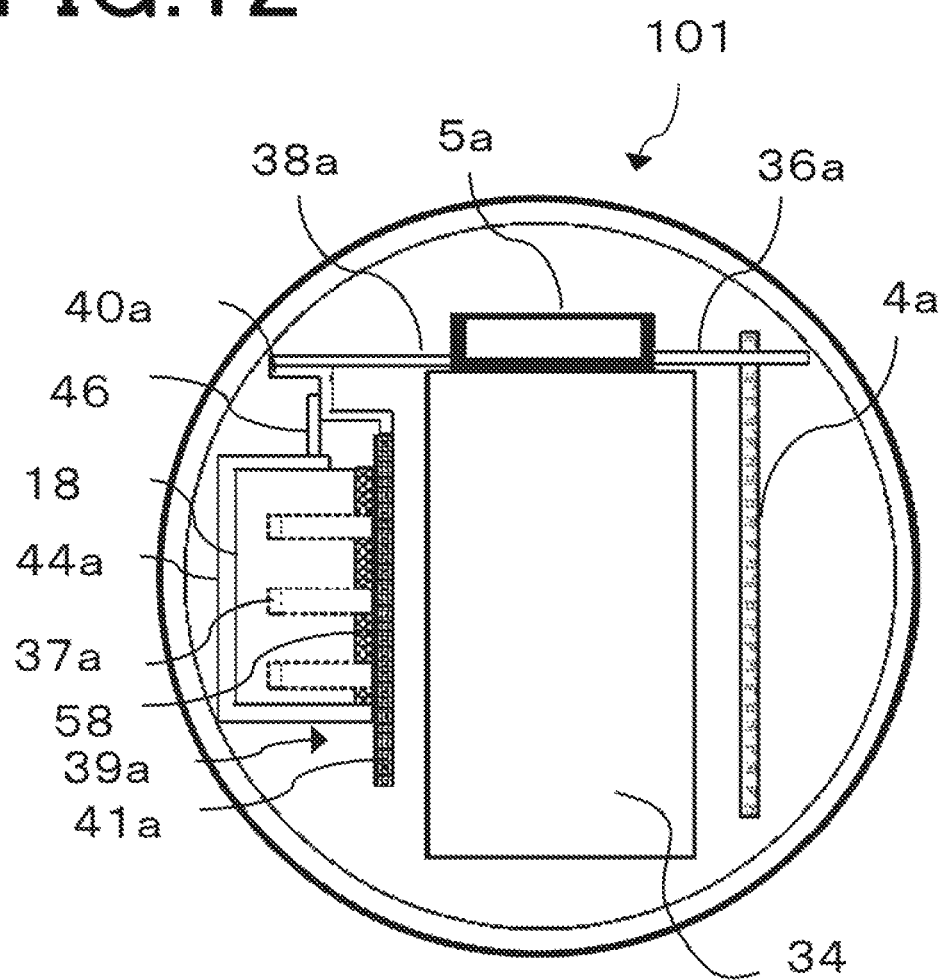
FIG. 12 is a perspective view of the electric rotating machine apparatus according to Embodiment 2, when viewed from the top side.

Hereinafter, an electric rotating machine apparatus 101 according to Embodiment 2 will be explained with reference to the drawings. FIG. 10 is a circuit diagram of an electric rotating machine apparatus 101 according to Embodiment 2. FIG. 11 is a cross-sectional view of the electric rotating machine apparatus 101 according to Embodiment 2. FIG. 12 is a perspective view of the electric rotating machine apparatus 101 according to Embodiment 2, when viewed from the top side.

In Embodiment 1, there has been explained the case where the control unit 1 for driving the electric rotating machine 2 includes the control units 1a and 1b of two systems; however, in Embodiment 2, there will be explained the case where the control unit 1 includes one system, i.e., a control unit 1c. FIG. 10 is a circuit diagram of the electric rotating machine apparatus 101. The reference characters 1c and 201 denote a control unit and a three-phase electric rotating machine, respectively. The control unit 1c has the same configuration as the control unit 1a in FIG. 1 does and is provided with substantially the same components.

FIG. 11 is a cross-sectional view of the electric rotating machine apparatus 101 in which the control unit 1 is integrated at the anti-output side of the electric rotating machine 201; the reference characters 1 and 201 denote a control unit and a multiphase-winding electric rotating machine, respectively. The electric rotating machine apparatus 101 is utilized as an electric power steering apparatus. The configuration of the electric rotating machine 201 is substantially the same as that in FIG. 1; however, the winding thereof includes only one system.

In the control unit 1, the outer layer thereof is covered with the housing 31; the power-source connector 32a to be connected with an external power source (the battery 8) and the signal connector 33a to be connected with the sensor group 11 are arranged on the anti-output-side endface thereof. The filter 7a, which is a relatively large component, and the like are mounted on a surface that is at the side on which the power-source connector 32a and the signal connector 33a are arranged and that is perpendicular to the output axle 22.

The columnar portion of the heat sink 34 is disposed in the housing 31. The control circuit unit 4a, the power modules 5a included in an inverter circuit, and the like are arranged therearound. The bottom portion 34a of the heat sink 34 has the shape of a circle inscribed in the case 21 of the electric rotating machine. The anti-output-side end of the output axle 22 is extended in the center thereof and the sensor rotor 30 is mounted thereon in the same manner as that in FIG. 2. As is the case with FIG. 2, the power-source connector 32a and the various kinds of signal connectors 33a are electrically connected with the bus bars and the smoothing capacitors 18.

FIG. 12 is a perspective view of the electric rotating machine apparatus 101, when viewed from the top side. The heat sink 34 whose columnar portion is substantially rectangular parallelepiped is disposed in the central portion; the control circuit unit 4a is disposed along one side of the columnar portion; the power module 5a is disposed in such a way as to adhere to one side of the columnar portion adjacent to the control circuit unit 4a. The bus bar unit 39a is disposed on a surface facing the control circuit unit 4a. The configuration including the bus-bar holder 41a, the smoothing capacitor 18, the adhesive 58, and the capacitor holder 44a is the same as that of Embodiment 1.

Each of the terminals U, V, and W (unillustrated) of the winding end portion 27a is disposed toward the outer circumferential direction of the bus bar unit 39a and is connected with the output terminal 38a of the power module 5a through the bus bar unit 39a. In addition, the circuit board 35 is disposed in the hole that penetrates the bottom portion of the heat sink 34.

The same effect as that of Embodiment 1 can be obtained also in the apparatus configured in such a manner as described above. As described above, also in the case of an electric power steering apparatus having one piece each of electric-rotating-machine wiring and electric-rotating-machine driving circuit, it is made possible to provide an apparatus that has a high vibration resistance and an excellent product-assembly efficiency.

3. Embodiment 3

Figure 13:
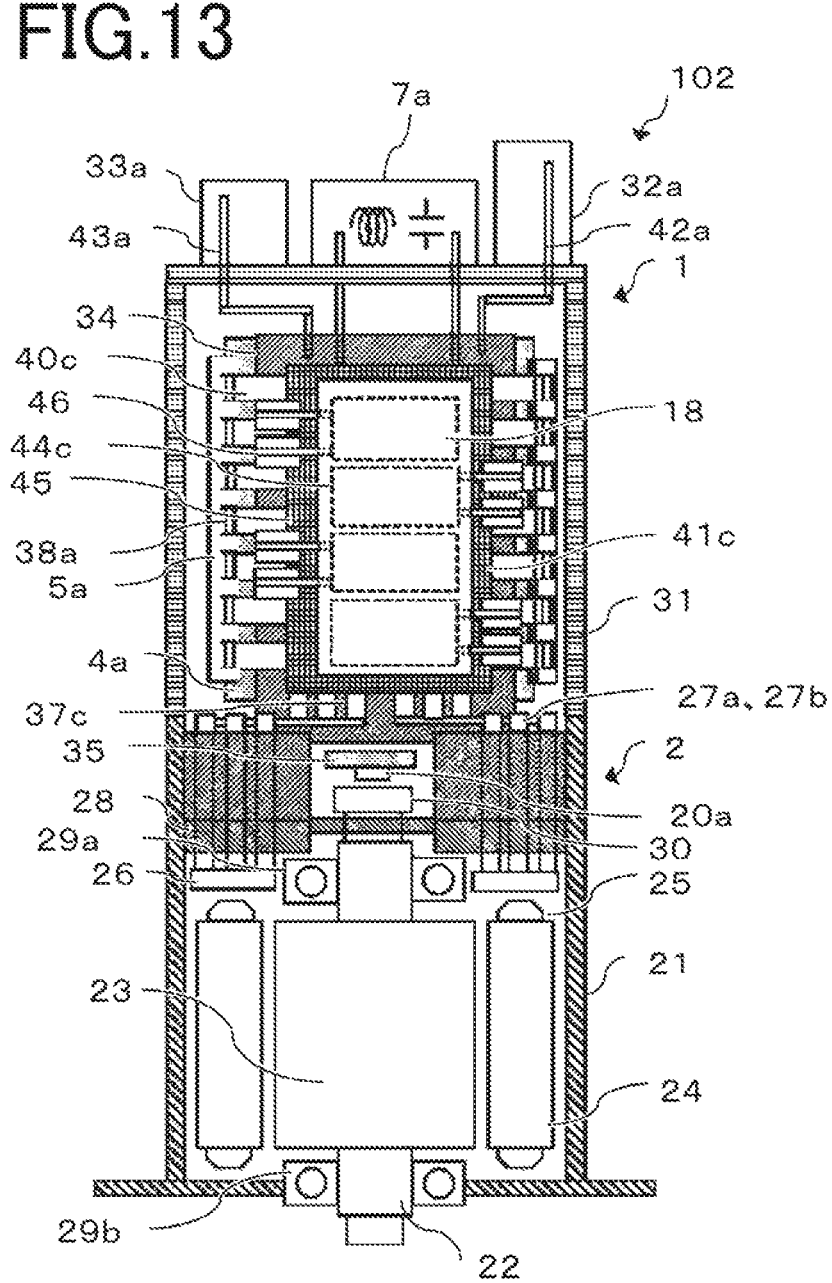
FIG. 13 is a cross-sectional view of an electric rotating machine apparatus according to Embodiment 3.
Figure 14:
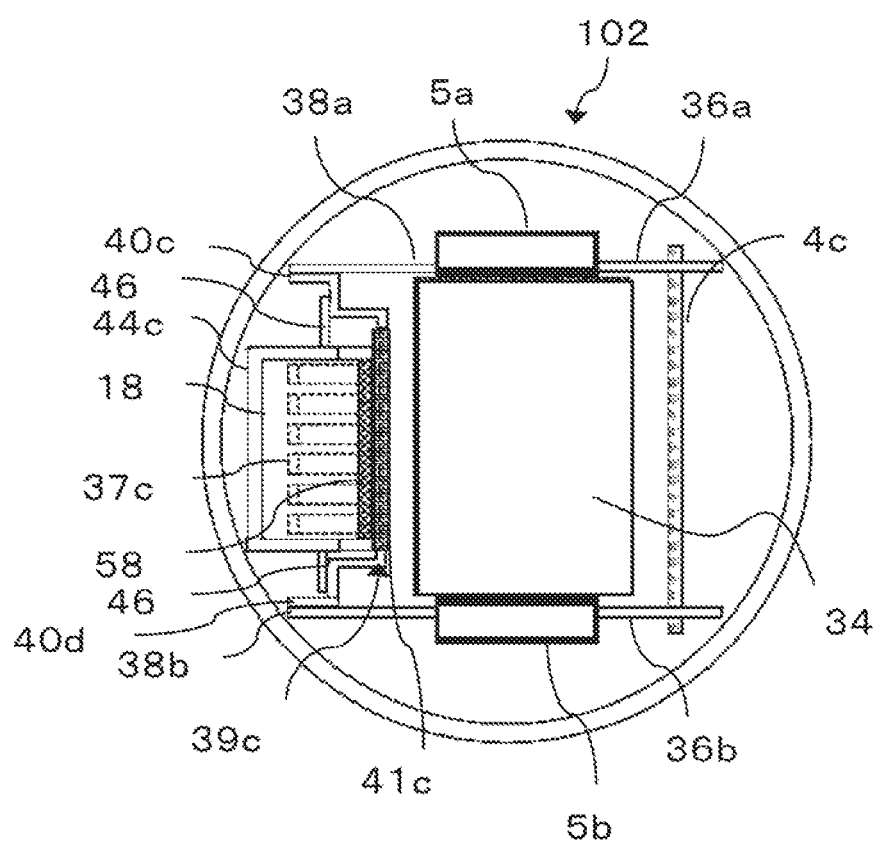
FIG. 14 is a perspective view of the electric rotating machine apparatus according to Embodiment 3, when viewed from the top side.
Figure 15:
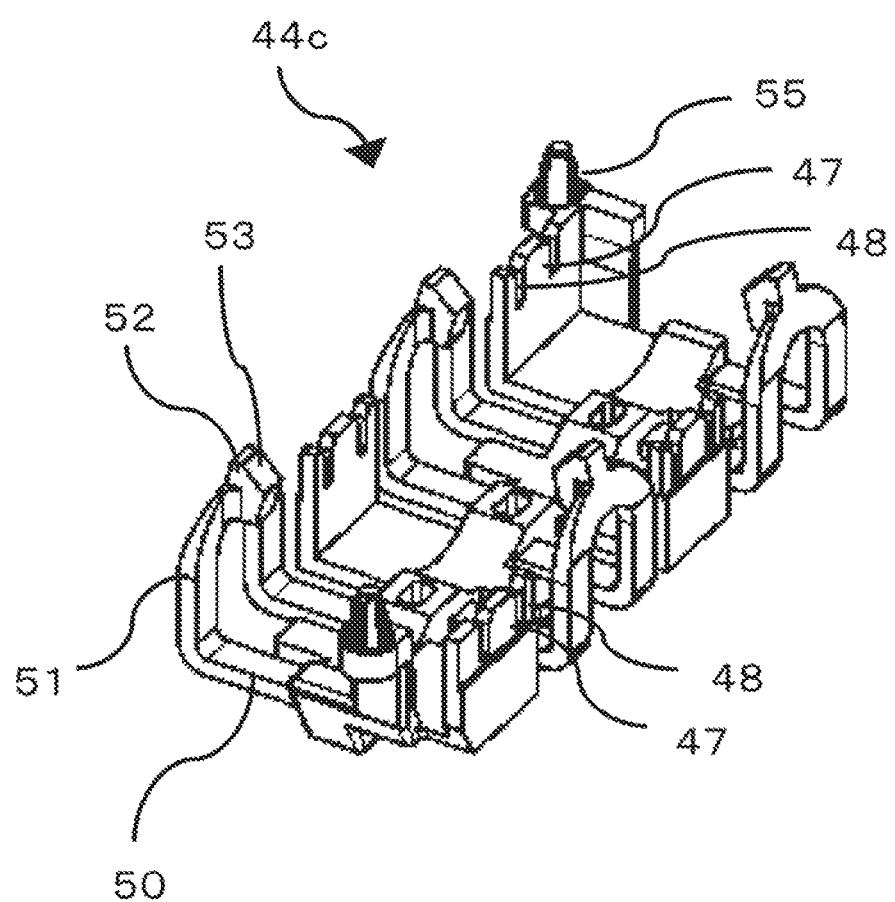
FIG. 15 is an external view of the inside of a capacitor holder in the electric rotating machine apparatus according to Embodiment 3.
Figure 16:
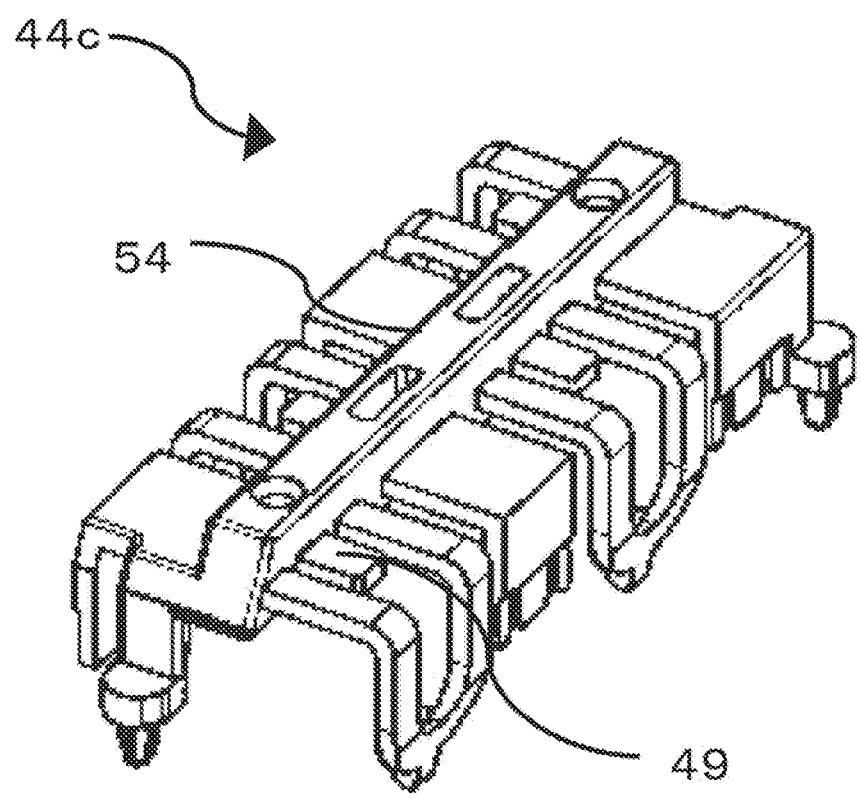
FIG. 16 is an external view of the outside of the capacitor holder in the electric rotating machine apparatus according to Embodiment 3.
Figure 17:
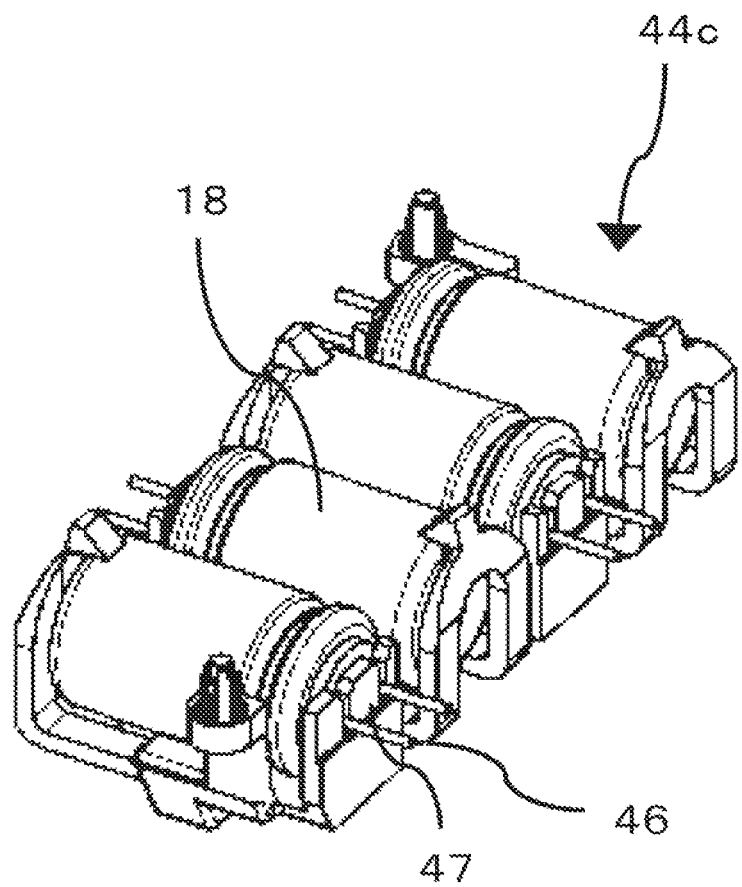
FIG. 17 is an external view of the inside of the capacitor holder in the electric rotating machine apparatus according to Embodiment 3, when capacitors are mounted in the capacitor holder.
Figure 18:
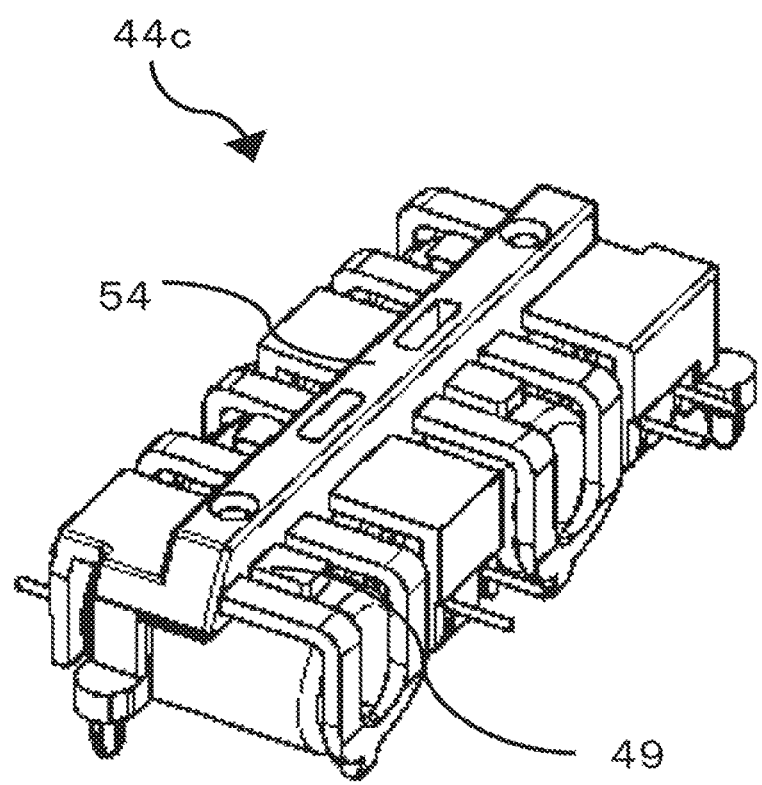
FIG. 18 is an external view of the outside of the capacitor holder in the electric rotating machine apparatus according to Embodiment 3, when the capacitors are mounted in the capacitor holder.
Figure 19:
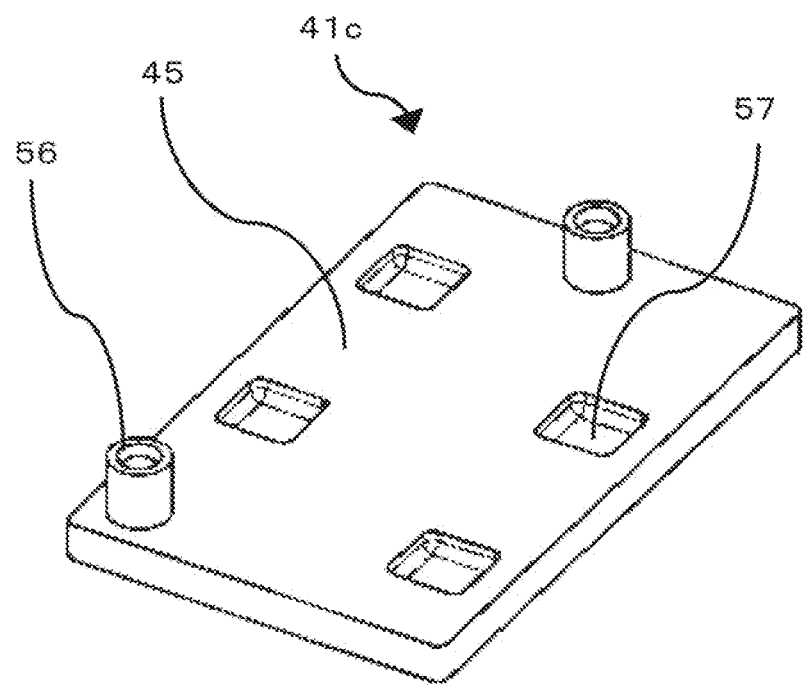
FIG. 19 is an external view of a bus-bar holder in the electric rotating machine apparatus according to Embodiment 3.

Hereinafter, an electric rotating machine apparatus 102 according to Embodiment 3 will be explained with reference to the drawings. FIG. 13 is a cross-sectional view of the electric rotating machine apparatus 102 according to Embodiment 3. FIG. 14 is a perspective view of the electric rotating machine apparatus 102 according to Embodiment 3, when viewed from the top side. FIG. 15 is an external view of the inside of a capacitor holder 44c in the electric rotating machine apparatus 102 according to Embodiment 3. FIG. 16 is an external view of the outside of the capacitor holder 44c in the electric rotating machine apparatus 102 according to Embodiment 3. FIG. 17 is an external view of the inside of the capacitor holder 44c in the electric rotating machine apparatus 102 according to Embodiment 3, when the smoothing capacitors 18 are mounted in the capacitor holder 44c. FIG. 18 is an external view of the outside of the capacitor holder 44c in the electric rotating machine apparatus 102 according to Embodiment 3, when the smoothing capacitors 18 are mounted in the capacitor holder 44c. FIG. 19 is an external view of a bus-bar holder 41c in the electric rotating machine apparatus 102 according to Embodiment 3.

Embodiment 3 is an variant example of Embodiment 1 and is different from Embodiment 1 in that a single control circuit unit 4c drives the power modules 5a and 5b of two systems and in that the respective directions of the terminals 46 of the smoothing capacitors 18 are set alternately. Although not illustrated, Embodiment 3 includes a multiphase-winding electric rotating machine 2, power-relay switching devices 6a and 6b of two systems for supplying currents to the multiphase-winding electric rotating machine 2, and the power modules 5a and 5b of two systems including respective inverter circuits. The control circuit unit 4c includes two driving circuits for driving the power modules 5a and 5b of two systems.

FIG. 13 is a cross-sectional view of the electric rotating machine apparatus 102 in which the control unit 1 is integrated at the anti-output side of the electric rotating machine 2; the reference characters 1 and 2 denote a control unit and a multiphase-winding electric rotating machine, respectively. The electric rotating machine apparatus 102 is utilized as an electric power steering apparatus. The configuration of the electric rotating machine 2 is the same as that in FIG. 1.

The outer layer of the control unit 1 is covered with the housing 31. The power-source connector 32a to be connected with an external power source (the battery 8) and the signal connector 33a to be connected with the sensor group 11 are arranged on the endface, at the side opposite to the output side of the output axle, of the control unit 1. The filter 7a, which is a relatively large component, and the like are mounted on a surface that is at the side on which the power-source connector 32a and the signal connector 33a are arranged and that is perpendicular to the output axle 22.

In the housing 31, the columnar portion of the heat sink 34 is disposed in the central portion thereof; the control circuit unit 4c, the power modules 5a and 5b, and the like are arranged around the columnar portion. The bottom portion 34a of the heat sink 34 has the shape of a circle inscribed in the case 21 of the electric rotating machine. The anti-output-side end of the output axle 22 is extended in the center thereof and the sensor rotor 30 is mounted thereon in the same manner as that in FIG. 2. As is the case with FIG. 2, the power-source connector 32a and the various kinds of signal connectors 33a are electrically connected with power-source-system bus bars 40c and 40d and the control circuit unit 4c.

FIG. 14 is a perspective view of the electric rotating machine apparatus 102, when viewed from the top side. The heat sink 34 whose columnar portion is substantially rectangular parallelepiped is disposed in the central portion; the control circuit unit 4c is disposed along one side of the columnar portion; the power modules 5a and 5b are arranged in such a way as to adhere to two respective sides of the columnar portion adjacent to the control circuit unit 4c. A bus bar unit 39c is disposed on a surface facing the control circuit unit 4c.

Here, the capacitor holder 44c, the bus-bar holder 41c, and the smoothing capacitor 18 will be explained by use of FIGS. 13 and 14. Two or more smoothing capacitors 18 (four pieces, in the present embodiment) are contained in the capacitor holder 44c. The capacitor holder 44c holding the two or more smoothing capacitors 18 is fixed to the surface 45 of the bus-bar holder 41c in a substantially parallel manner through press-fitting, snap fitting, the adhesive 58, or the like. In the present embodiment, the protruding portion 55 provided in the capacitor holder 44c is inserted into the hole 56 provided in the after-mentioned bus-bar holder 41c, so that the capacitor holder 44c is fixed thereto.

Next, the state in which the assembly has been performed will be explained. As illustrated in FIG. 13, the two or more longitudinally cylindrical tubular smoothing capacitors 18 are arranged in the output-axle direction in such a way that the longitudinal directions thereof are perpendicular to the output axle of the electric rotating machine 2 (corresponding to "vertically stacked in a substantially parallel manner" described in claim 1). In addition, as illustrated in FIGS. 13 and 14, the respective terminals 46 of the two or more smoothing capacitors 18 are connected with the power-source-system bus bars 40c and 40d in the alternate directions. As illustrated in FIG. 10, the capacitor holder 44c is disposed at the radial-direction outer side of the electric rotating machine 2 with respect to the two or more smoothing capacitors 18.

FIGS. 15 through 18 illustrate the external views of the capacitor holder 44c. In addition, FIG. 16 illustrates the state where the smoothing capacitors 18 are contained. Each of the pressing portion 47, the terminal groove portion 48, the bearing portion 49, the beam portion 50, the U-shaped beam portions 51, and the hook portion 52 of the capacitor holder 44c has the same shape as that of each thereof in Embodiment 1; they are arranged alternately in accordance with the direction of the terminal 46 of the smoothing capacitor 18. In addition, each of the rib 54 and the protruding portion 55 of the capacitor holder 44c also has the same structure as each thereof in Embodiment 1 has.

FIG. 19 illustrates the external view of the bus-bar holder 41c. The recessed portions 57 that contains the hook portions 52 after the bus-bar holder 41c and the capacitor holder 44c are assembled are alternately provided; in the same manner as that in Embodiment 1, the smoothing capacitor 18 and the capacitor holder 44c are fixed to the bus-bar holder 41c with the adhesive 58.

The terminals U, V, and W (unillustrated) of the winding end portion 27a, 27b are disposed toward the outer circumferential direction of the bus bar unit 39c and are connected with the output terminal 38a of the power module 5a, 5b through the bus bar unit 39c. In addition, the circuit board 35 is disposed in the hole that penetrates the bottom portion of the heat sink 34.

In the apparatus configured in such a manner as described above, in addition to the same effect as that of Embodiment 1, the noise-suppression effect is raised, because the alternate arrangement of the directions of the smoothing capacitors 18 makes it possible that the connection position of the terminal 46 of the smoothing capacitor 18 is provided close to each corresponding one of the power modules 5a and 5b of the two systems. As far as the arrangement of the two or more smoothing capacitors 18 is concerned, it may be allowed that the smoothing capacitors 18 with different directions are alternately arranged or that the smoothing capacitors 18 with the same direction are collectively arranged for each group. In the case of four pieces of the smoothing capacitors 18, it may be allowed that the smoothing capacitors 18 are arranged in that order—in one direction, in the other direction, in the other direction, and in the one direction.

As described above, also in the case of an electric power steering apparatus having two pieces each of electric-rotating-machine wirings and electric-rotating-machine driving circuits, it is made possible to provide an apparatus that has a high vibration resistance, an excellent product-assembly efficiency, and a high noise-suppression effect.

Effect of Embodiment 3

(q) In the electric rotating machine apparatus 102 according to Embodiment 3, the two or more smoothing capacitors 18 are assembled to the capacitor holder 44c in such a way that one group thereof are arranged with the respective terminals 46 being oriented toward one side and the other group thereof are arranged with the respective terminals 46 being oriented toward the other side.

Because the alternate arrangement of the directions of the smoothing capacitors 18 makes it possible that the connection position of the terminal 46 of the smoothing capacitor 18 is provided close to each corresponding one of the power modules 5a and 5b of the two systems, the noise-suppression effect is raised.

As described above, in Embodiments 1 through 3, there have been explained the smoothing capacitors 18 connected with the switching devices 14 and 15 in the power modules 5a and 5b, respectively. However, the technologies according to Embodiments 1 through 3 can be applied to fixing the smoothing capacitors 60a and 61a and the smoothing capacitors 60b and 61b, of the filters 7a and 7b, respectively, that are also large-capacity capacitors to be utilized in smoothing. With regard to one of or both of the set of the smoothing capacitors 60a and 60b and the set of the smoothing capacitors 61a and 61b, the fixing methods according to Embodiments 1 through 3 for fixing the capacitor holder 44a, 44b, 44c with the bus-bar holder 41a, 41b, 41c are effective, as the configuration in which two or more smoothing capacitors are compactly fixed while the vibration resistance is secured and the assembly efficiency is raised.

4. Embodiment 4

Figure 20:
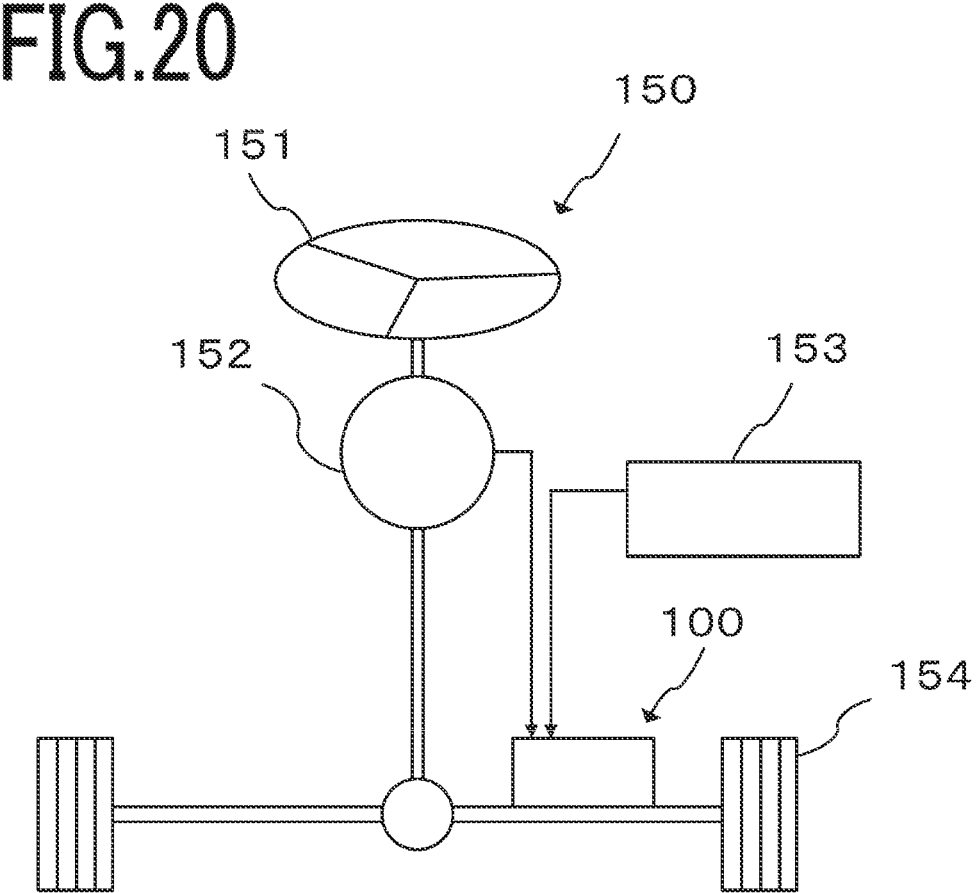
FIG. 20 is a configuration diagram of an electric power steering apparatus according to Embodiment 4.

FIG. 20 is a configuration diagram of an electric power steering apparatus 150 according to Embodiment 4. By use of FIG. 20, there will be explained an example in which the electric rotating machine apparatus 100 is applied to the electric power steering apparatus 150 to be mounted in a vehicle. FIG. 20 is an overall configuration diagram of the electric power steering apparatus 150 and illustrates an example of a rack-type electric power steering apparatus. Even when instead of the electric rotating machine apparatus 100, the electric rotating machine apparatus 101 or 102 is utilized in the electric power steering apparatus 150 according to Embodiment 4, the same effect is provided.

When a driver makes the steering mechanism of a vehicle generate steering torque by means of a steering wheel 151, a torque sensor 152 detects the steering torque and then outputs it to the electric rotating machine apparatus 100. In addition, a speed sensor 153 detects the traveling speed of the vehicle and then outputs it to the electric rotating machine apparatus 100. Based on the inputs from the torque sensor 152 and the speed sensor 153, the electric rotating machine apparatus 100 generates auxiliary torque for supplementing the steering torque and then supplies it to the steering mechanism of front wheels 154 of the vehicle. The torque sensor 152 and the speed sensor 153 are included in the sensor group 11 in FIG. 1. It may be allowed that the electric rotating machine apparatus 100 generates auxiliary torque based on inputs other than the inputs from the torque sensor 152 and the speed sensor 153.

Effect of Embodiment 4

(r) The electric rotating machine apparatus according to Embodiment 4 includes the electric rotating machine apparatus 100 and the like.

The vibration resistance and the assembly efficiency of the electric rotating machine apparatus to be applied to the electric power steering apparatus are raised; as a result, the reliability of the electric power steering apparatus 150 is enhanced; thus, this method can contribute to cost reduction through improvement of the productivity.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the present disclosure. For example, there are included the case where at least one constituent element is modified, added, or omitted and the case where at least one constituent element is extracted and then combined with constituent elements of other embodiments.

DESCRIPTION OF REFERENCE NUMERALS 2, 201: electric rotating machine, 5a, 5b: power module, 18: smoothing capacitor, 22: output axle, 33a, 33b: signal connector, 40a, 40b, 40c, 40d: power-source-system bus bar, 41a, 41b, 41c: bus-bar holder, 44a, 44b, 44c: capacitor holder, 45: surface, 46: terminal, 47: pressing portion, 48: terminal groove portion, 49: bearing portion, 50: beam portion, 51: U-shaped beam portion, 52: hook portion, 53: guide groove portion, 54: rib, 55: protruding portion, 56: hole, 57: recessed portion, 58: adhesive, 59: snap fitting portion, 100, 101, 102: electric rotating machine apparatus

What is claimed is:
1. An electric rotating machine apparatus comprising:
an electric rotating machine having a winding and an output axle;
a power module having a switching device connected with the winding;
a bus bar that is held by a bus-bar holder and is included in a power-supply path to the power module;
two or more smoothing capacitors connected with the bus bar; and
a capacitor holder in which at a more outer side in a radial direction of the electric rotating machine than the bus-bar holder is, the two or more smoothing capacitors are arranged in an axial direction of the electric rotating machine, and that holds the two or more smoothing capacitors from an outer circumferential side of the electric rotating machine,
wherein the capacitor holder includes:
a pressing portion that is provided at a terminal side of the smoothing capacitor connected with the bus bar and to which the smoothing capacitor is pressed, and
a snap fitting portion that is provided at a side opposite to the pressing portion side across the smoothing capacitor and that fixes the smoothing capacitor.

2. The electric rotating machine apparatus according to claim 1, wherein respective center axes of the two or more smoothing capacitors each formed in the shape of a column are arranged along a circumferential direction of the electric rotating machine.

3. The electric rotating machine apparatus according to claim 1, wherein the capacitor holder is fixed to the bus-bar holder.

4. The electric rotating machine apparatus according to claim 1,
wherein the bus-bar holder has a fixing hole or a protruding portion in an end portion thereof,
wherein the capacitor holder has a protruding portion or a fixing hole in an end portion thereof, and
wherein the protruding portion is inserted into the fixing hole, so that the bus-bar holder and the capacitor holder are fixed to each other.

5. The electric rotating machine apparatus according to claim 1, wherein a terminal groove portion through which the terminal of the smoothing capacitor passes is provided in the pressing portion of the capacitor holder.

6. The electric rotating machine apparatus according to claim 1,
wherein respective center axes of the two or more smoothing capacitors each formed in the shape of a column are arranged along the circumferential direction of the electric rotating machine, and
wherein the capacitor holder includes
a main body portion provided at a more radially outer side of the electric rotating machine than the smoothing capacitor is,
the pressing portion that extends from the main body portion toward a radial-direction inner side of the electric rotating machine, at one axial-direction side of the smoothing capacitor, and
the snap fitting portion that extends from the main body portion toward the radial-direction inner side of the electric rotating machine, at the other axial-direction side of the smoothing capacitor.

7. The electric rotating machine apparatus according to claim 1,
wherein respective center axes of the two or more smoothing capacitors each formed in the shape of a column are arranged along the circumferential direction of the electric rotating machine,
wherein the pressing portion is provided at the one axial-direction side of the smoothing capacitor,
wherein the snap fitting portion is provided at the other axial-direction side of the smoothing capacitor, and
wherein the snap fitting portion includes
two beam portions that each extend in the other axial-direction side of the smoothing capacitor, along a portion, at the radial-direction outer side of the electric rotating machine, in an outer circumferential surface of the smoothing capacitor, and then each extend, at the other axial-direction side of the smoothing capacitor, toward the radial-direction inner side of the electric rotating machine, avoiding the center axis of the smoothing capacitor,
a connection portion that connects respective front ends of the two beam portions, and
a hook portion provided in the connection portion.

8. The electric rotating machine apparatus according to claim 7, wherein at a space between the two beam portions that each extend along the outer circumferential surface of the smoothing capacitor, the capacitor holder has a bearing portion that extends in the axial direction of the smoothing capacitor and supports the outer circumferential surface of the smoothing capacitor.

9. The electric rotating machine apparatus according to claim 7, wherein each of the two beam portions and the connection portion does not abut on the smoothing capacitor, but the hook portion abuts on and holds the smoothing capacitor.

10. The electric rotating machine apparatus according to claim 7, wherein the hook portion of the capacitor holder is provided with a guide groove portion into which the end portion, at the anti-terminal side, of the smoothing capacitor is inserted in a sliding manner, at a time when the smoothing capacitor is mounted.

11. The electric rotating machine apparatus according to claim 7, wherein the bus-bar holder is provided with a recessed portion that houses the hook portion of the capacitor holder.

12. The electric rotating machine apparatus according to claim 1, wherein the capacitor holder is provided with a rib at the anti-smoothing capacitor side.

13. The electric rotating machine apparatus according to claim 1, wherein the two or more smoothing capacitors are assembled to the capacitor holder in such a way that the respective directions of the terminals thereof are the same.

14. The electric rotating machine apparatus according to claim 1, wherein the two or more smoothing capacitors are assembled to the capacitor holder in such a way that one group thereof are arranged with the respective terminals being oriented toward one side and the other group thereof are arranged with the respective terminals being oriented toward the other side.

15. The electric rotating machine apparatus according to claim 1, wherein the capacitor holder is fixed to the bus-bar holder through the intermediary of an adhesive.

16. The electric rotating machine apparatus according to claim 1, wherein the smoothing capacitor is fixed to at least one of the capacitor holder and the bus-bar holder through the intermediary of an adhesive.

17. An electric power steering apparatus having the electric rotating machine apparatus according to claim 1.

* * * * *